US009235059B2

(12) United States Patent
Nomura et al.

(10) Patent No.: US 9,235,059 B2
(45) Date of Patent: Jan. 12, 2016

(54) DRIVE SYSTEM FOR ROTATABLE OPTICAL ELEMENT

(71) Applicant: HOYA CORPORATION, Tokyo (JP)

(72) Inventors: Hiroshi Nomura, Saitama (JP);
Toshiharu Suzuki, Saitama (JP);
Yoshifumi Fujisaki, Tokyo (JP);
Mutsumi Koguchi, Saitama (JP)

(73) Assignee: HOYA CORPORATION, Tokyo (JP)

( * ) Notice: Subject to any disclaimer, the term of this patent is extended or adjusted under 35 U.S.C. 154(b) by 262 days.

(21) Appl. No.: 13/792,990

(22) Filed: Mar. 11, 2013

(65) Prior Publication Data
US 2013/0242390 A1    Sep. 19, 2013

(30) Foreign Application Priority Data
Mar. 16, 2012 (JP) ................................. 2012-059565

(51) Int. Cl.
G02B 27/28     (2006.01)
G02B 7/00      (2006.01)
G03B 11/00     (2006.01)

(52) U.S. Cl.
CPC ............. *G02B 27/281* (2013.01); *G02B 7/006* (2013.01); *G03B 11/00* (2013.01); *G03B 2205/0053* (2013.01)

(58) Field of Classification Search
CPC ............. G02B 7/02; G02B 7/04; G02B 7/08; G02B 7/09; G02B 7/006; G02B 27/281; G03B 17/12; G03B 17/14; G03B 11/00; G03B 2205/0053; G03B 5/02; H04N 5/2254

USPC ............. 359/490.01, 490.02, 819, 822, 824, 359/829, 830, 871, 872, 875, 877, 762; 396/73, 439, 529, 530; 348/360

See application file for complete search history.

(56) References Cited

U.S. PATENT DOCUMENTS 6,137,958 A    10/2000 Toyoda
2006/0274435 A1   12/2006 Nomura et al.

FOREIGN PATENT DOCUMENTS

JP    03-192231     8/1991
JP    2006-337695   12/2006

*Primary Examiner* — Zachary Wilkes
*Assistant Examiner* — Wen Huang
(74) *Attorney, Agent, or Firm* — Greenblum & Bernstein, P.L.C.

(57) ABSTRACT

A drive system includes a rotational driving member, a rotational driven member, to which a rotational resistance is applied, a holding member of a rotatable optical element supported by the rotational driving member and the rotational driven member, an insertion controller preventing the holding member from rotating when the holding member is in an inserted position, and a removal controller allowing the holding member to move to a fully removed position and prevents the holding member from rotating at a limited removed position. An insertion/removal operation of the holding member is performed by relative rotation between the rotational driving member and the rotational driven member, and when the holding member is prevented from rotating by the insertion controller and the removal controller, the rotational driven member and the holding member rotate with the rotational driving member about the optical axis.

15 Claims, 42 Drawing Sheets

DRIVE SYSTEM FOR ROTATABLE OPTICAL ELEMENT

BACKGROUND OF THE INVENTION

1. Field of the Invention

The present invention relates to a drive system for a rotatable optical element, which can be inserted into and removed from an optical path and which produces a required optical effect by being rotated about an optical axis when positioned in the optical path like a polarizing filter.

2. Description of the Related Art

A drive system for driving such a rotatable optical element has been proposed in Japanese Unexamined Patent Publication No. 2006-337695. Specifically, in this drive system an insertion/removal frame which is pivoted about a rotational shaft parallel to an optical axis of a photographing optical system is supported to be rotatable forwardly and reversibly (swingable) between an inserted position, in which the rotatable optical element is positioned in the optical path, and a removed position, in which the rotatable optical element is removed away from the optical path, and the rotatable optical element is held by an annular holding frame provided as a separate member from the insertion/removal frame. The annular holding frame is supported to be rotatable relative to the insertion/removal frame about a rotational axis parallel to the optical axis. A sun gear of a planetary gear mechanism for transmission of a driving force of a motor is coaxially supported by a shaft support portion of the insertion/removal frame, and a planet gear of the planetary gear mechanism that is in mesh with the sun gear is supported by the insertion/removal frame thereon. A circumferential surface gear is formed on the outer periphery of the annular holding frame, while a gear train capable of transmitting a rotational force between the circumferential surface gear and the planet gear is arranged on the insertion/removal frame. A friction having a predetermined magnitude is applied to rotation of a gear of the gear train. In a state where no restrictions are imposed on the rotation of the insertion/removal frame, rotations of the gears of the gear train are limited by the aforementioned friction, so that rotating the sun gear causes the planet gear to move (revolve) around the sun gear, thus causing the insertion/removal frame to rotate. The insertion/removal frame is prevented from further rotating beyond each of the inserted position and the removed position. If the sun gear is made to keep rotating in the same rotational direction with the insertion/removal frame prevented from rotating, the force resisting (limiting) the rotation of the insertion/removal frame exceeds the aforementioned friction, which causes the planet gear to rotate on its axis without revolving around the sun gear to thereby rotate the gears of the gear train. Consequently, the annular holding frame, to which the driving force is transmitted to the circumferential surface gear thereof, rotates relative to the insertion/removal frame. By making the annular holding frame perform this rotational operation when the insertion/removal frame is in the inserted position, a required optical effect of the rotatable optical element (e.g., a polarizing filter) on the annular holding frame can be obtained.

The polarizing filter drive system disclosed in Japanese Unexamined Patent Publication H03-192231 is provided with a drive ring which rotates about an optical axis of a photographing optical system by a motor and a rotational member which is rotatable relative to this drive ring. In addition, a polarizing filter is pivotally supported by the rotational member thereon, and a sector gear on the polarizing filter is engaged with an internal toothed portion formed on an inner peripheral surface of the drive ring. The polarizing filter is held in an inserted position, in which the polarizing filter is positioned in an optical path, by abutting against one of the two pins (stoppers) formed on the rotational member, while the polarizing filter is held in a removed position, in which the polarizing filter is removed from the optical path, by abutting against the other pin. When the drive ring is driven to rotate in a direction in which the polarizing filter is not prevented from rotating by the aforementioned two pins, this rotational driving force is transmitted to the polarizing filter via gears to thereby rotate the polarizing filter between the inserted position and the removed position without rotating the rotational member. On the other hand, in a state where the polarizing filter is in contact with one of the two pins which determines the inserted position of the polarizing filter, if the drive ring is driven to rotate in a direction to give the polarizing filter a force that further moves the polarizing filter in the filter insertion direction, the polarizing filter which is prevented from further rotating relative to the rotational member is rotated together with the rotational member about the optical axis.

According to the rotatable optical element drive system disclosed in Japanese Unexamined Patent Publication No. 2006-337695, simplification and miniaturization of this drive system can be achieved by making a single motor perform both the insertion/removal operation of the rotatable optical element and the rotational operation of the same optical element on the optical path. On the other hand, there is room for improvement in the rotatable optical element drive system in the following respects. Firstly, limitations exist on miniaturization and weight reduction of the insertion/removal operating parts because the rotatable optical element drive system has a structure in which the gear train and other components which are components of the rotatable optical element drive system are supported by the insertion/removal frame thereon. Additionally, the portion which supports the annular holding frame to be rotatable relative to the insertion/removal frame makes cylindrical surfaces, the axes of which are parallel to an optical axis of the photographing optical system (more precisely, conical surfaces which are slightly tapered with respect to the optical axis), slidingly contact each other, thus being required to have a certain amount of length in the optical axis direction. Therefore, limitations exist also in slimming down the insertion/removal frame and the annular holding frame in the optical axis direction. Secondly, since the gear train supported by the insertion/removal frame thereon serves as a reduction gear train, the torque required to rotate the annular holding frame tends to be great, so that there has been a problem with it being difficult to rotate the annular holding frame at a high speed.

In the rotatable optical element drive system disclosed in Japanese Unexamined Patent Publication H03-192231, the polarizing filter, which also constitutes part of the drive system that performs an insertion/removal operation with respect to an optical path, has a simple structure having no gear train or other moving parts, so that miniaturization, weight reduction and reduction in driving load can be achieved. On the other hand, since the polarizing filter can be inserted into and removed from the optical path from any position in the rotational direction about an optical axis, each of the rotational member and the drive ring needs to be formed as a large-diameter member, which corresponds to any removed position of the polarizing filter over the entire circumference of the drive ring, so that there is a possibility of the drive system being enlarged in the radial direction. In addition, if the polarizing filter reaches the inserted position and the removed position at different positions in the rotational direction of the rotational member, respectively, when the insertion/removal operation of the polarizing filter is performed, the configuration of the position detector becomes complicated and the degree of difficulty in position detection is high.

SUMMARY OF THE INVENTION

The present invention has been devised in view of the above described problems and provides a drive system which makes the rotatable optical element perform an insertion/removal operation with respect to a photographing optical path and a rotational operation in a state of being inserted into the photographing optical path, wherein both an improvement in drivability of the rotatable optical element and miniaturization of the drive system are achieved.

According to an aspect of the present invention, a drive system is provided, for a rotatable optical element which is insertable into and removable from an optical path of a photographing optical system, and also rotatable about an optical axis of the photographing optical system when the rotatable optical element is positioned in the optical path. The drive system includes a support member; a rotational driving member which is supported by the support member to be rotatable about the optical axis and which is driven to rotate about the optical axis by a driving source; a rotational driven member which is supported by the support member to be rotatable about the optical axis and which is rotatable about the optical axis relative to the rotational driving member; a resistance applier which applies rotational resistance to the rotational driven member; a holding member which holds the rotatable optical element, includes a rotation transmission portion, to which a force in a rotational direction about the optical axis is transmitted from the rotational driving member, and a pivotal support portion pivotally supported on the rotational driven member, wherein the holding member inserts and removes the rotatable optical element into and from the optical path by forward and reverse rotations of the holding member about the pivotal support portion; an insertion controller which prevents the holding member from rotating when the holding member is in an inserted position, in which the rotatable optical element is inserted into the optical path; and a removal controller which allows the holding member to move to a fully removed position from the optical path when the holding member is positioned at a specific position in a rotational direction of the holding member about the optical axis, and which prevents the holding member from rotating about the pivotal support portion at a limited removed position, which is located radially closer to the optical axis than the fully removed position, when positioned at any other position in the rotational direction of the holding member. A differential rotation occurs between the rotational driven member, to which the resistance applier applies the rotational resistance, and the rotational driving member to thereby cause the holding member to rotate in an optical-element insertion/removal direction about the pivotal support portion by rotating the rotational driving member in a direction in which the holding member is not prevented from rotating by the insertion controller and the removal controller. The rotational driven member and the holding member rotate with the rotational driving member about the optical axis against the rotational resistance, which is applied to the rotational driven member by the resistance applier, by rotating the rotational driving member in a direction in which the holding member is prevented from rotating by the insertion controller when the holding member is in the inserted position. The rotational driven member and the holding member rotate with the rotational driving member about the optical axis against the rotational resistance, which is applied to the rotational driven member by the resistance applier, by rotating the rotational driving member in a direction in which the holding member is prevented from rotating by the removal controller when the holding member is positioned at the limited removed position, and the holding member rotates to the fully removed position by rotating the rotational driving member in the direction, in which the holding member is prevented from rotating by the removal controller, upon being positioned at the specific position in the rotational direction of the holding member.

It is desirable for at least a part of the removal controller to be formed on the support member.

It is desirable for the removal controller to include a cylindrical wall portion having a constant diameter about the optical axis which is formed on the support member, an accommodating wall portion which is continuous with the cylindrical wall portion and projects in a radially outward direction away from the optical axis, and a removal limit portion which is provided on the holding member and holds the holding member at the limited removed position by abutting against the cylindrical wall portion. The holding member is allowed to rotate to the fully removed position when the removal limit portion and the accommodating wall portion are substantially aligned in a radial direction from the optical axis.

It is desirable for the rotational driving member to include an elongated hole that is elongated in a radial direction from the optical axis. The rotation transmission portion of the holding member is formed as a projection which is inserted into the elongated hole in a manner to be prevented from moving in the rotational direction relative to the elongated hole and allowed to move in the radial direction of the elongated hole, and the projection constitutes the removal limit portion.

It is desirable for the removal controller to include a cylindrical wall portion, having a constant diameter about the optical axis, formed on the support member; an accommodating wall portion which is continuous with the cylindrical wall portion and projects in a radially outward direction away from the optical axis; and a swingable member which is pivotally supported by the rotational driven member via a pivot that is parallel to the optical axis, the swingable member including a removal limit portion which is contactable the cylindrical wall portion, and a linkage portion which is engaged with the holding member. The holding member is held at the limited removed position by abutment of the removal limit portion against the cylindrical wall portion. The holding member is allowed to rotate to the fully removed position when the removal limit portion of the swingable member and the accommodating wall portion are substantially aligned in a radial direction from the optical axis.

It is desirable for the holding member to be held in the fully removed position by abutment of the removal limit portion of the swingable member against the accommodating wall portion of the support member.

It is desirable for the linkage portion of the swingable member to include a linkage projection which projects in a direction parallel to the optical axis, and for the rotation transmission portion of the holding member to be formed from an elongated hole into which the linkage projection of the swingable member is slidably inserted.

It is desirable for the rotational driving member to include an elongated hole that is elongated in a radial direction from the optical axis. The swingable member comprises a rotation transmission projection which is inserted into the elongated hole in a manner to be prevented from moving in the rotational direction relative to the elongated hole and allowed to move in the radial direction of the elongated hole. The rotation transmission projection constitutes the removal limit portion.

It is desirable for the accommodating wall portion to include a guide surface which guides the holding member from the limited removed position to the fully removed position while making the removal limit portion slide on the guide surface.

It is desirable for the resistance applier to include a biaser which biases the rotational driven member in the optical axis direction to create a frictional resistance between the rotational driven member and the support member.

It is desirable for the insertion controller to include a pair of contact portions which are respectively provided on the holding member and the rotational driven member to be capable of coming into contact with each other.

It is desirable for the insertion controller to include a pair of contact portions which are respectively provided on the holding member and the rotational driving member to be capable of coming into contact with each other.

It is desirable for the insertion controller to include a pair of contact portions which are respectively provided on the rotational driven member and the rotational driving member to be capable of coming into contact with each other.

The rotational optical element can be a polarizing filter.

According to the drive system for the rotatable optical element according to the present invention, the holding member for the rotatable optical element can be miniaturized and reduced in weight, which makes it possible to improve the drivability of the rotatable optical element; moreover, the entire drive system can be made compact in size because the holding member is made to move to the fully removed position only when positioned at a specific position, with respect to the rotational direction of the holding frame about the optical axis.

The present disclosure relates to subject matter contained in Japanese Patent Application No. 2012-59565 (filed on Mar. 16, 2012) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
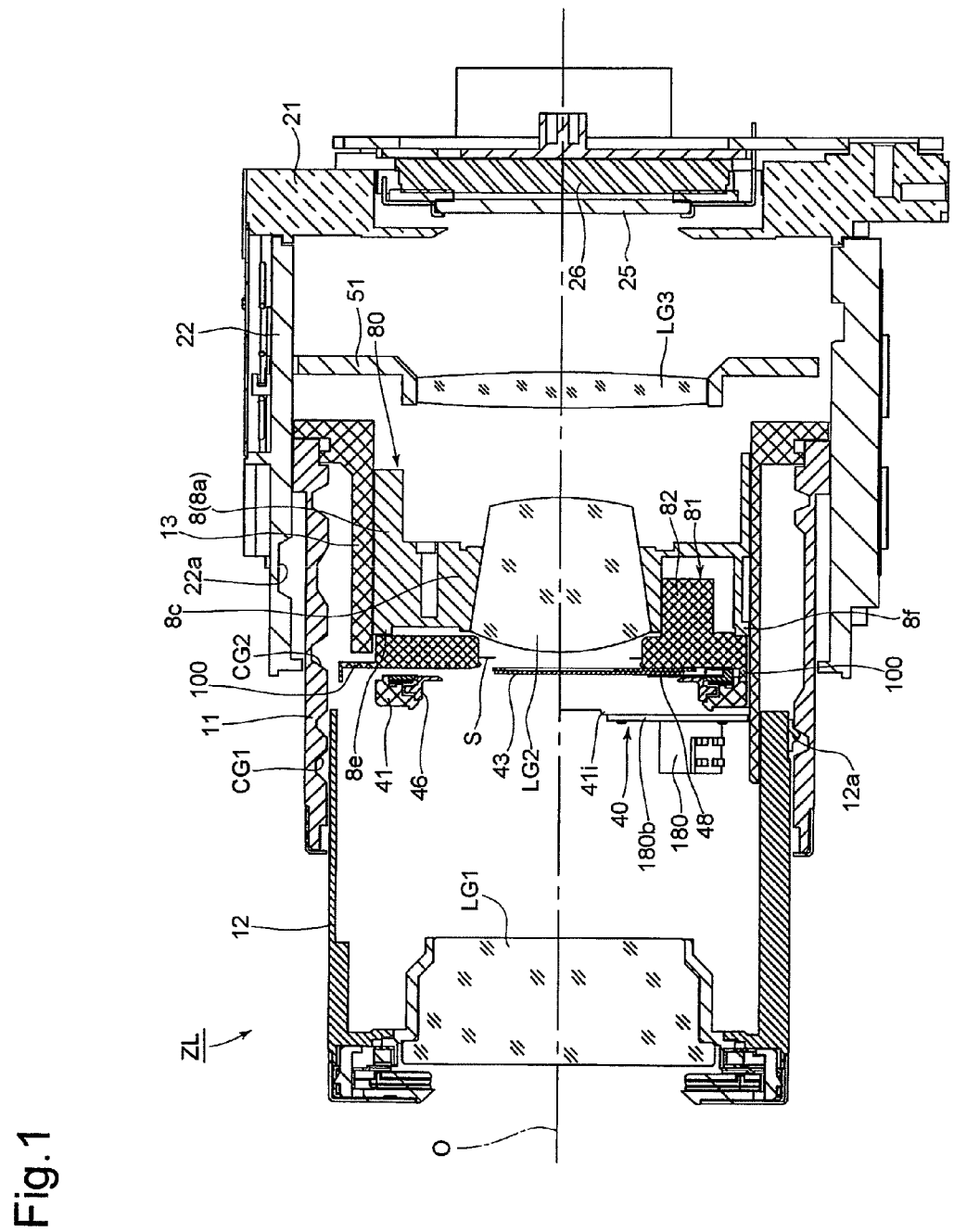
FIG. 1 is a longitudinal sectional view of an embodiment of a zoom lens barrel equipped with a drive system for a rotatable optical element according to the present invention, showing a ready-to-photograph state of the zoom lens barrel (in a zoom range)
Figure 2:
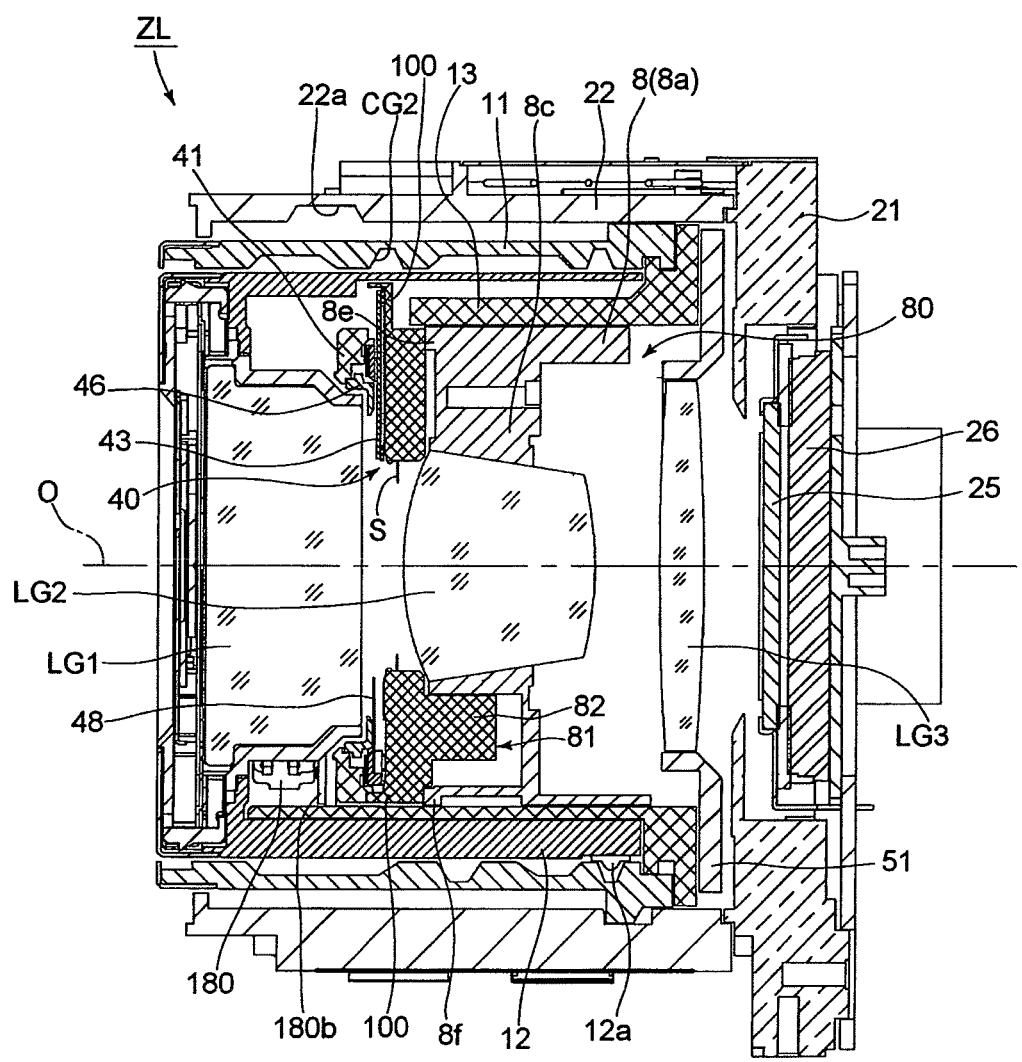
FIG. 2 is a longitudinal sectional view of the zoom lens barrel in a lens barrel accommodated state (fully-retracted state)

FIGS. 1 and 2 show an embodiment of a retractable zoom lens barrel ZL according to the present invention. The photographing optical system of the zoom lens barrel ZL is provided with a first lens group LG1, a shutter S, a second lens group LG2, a third lens group LG3, a low-pass filter (optical filter) 25 and an image sensor (image pickup device) 26, in that order from the object side. In addition, the zoom lens barrel ZL is provided with a polarizing filter (rotatable optical element) 43 which can be inserted into and removed from an optical path in front of the second lens group LG2. In the following descriptions, the term "optical axis direction" refers to a direction along or parallel to the optical axis O of the photographing optical system, the term "forward direction" refers to a forward optical axis direction (toward the object side), and the term "rearward direction" refers to a rearward optical axis direction (toward the image side). Additionally, in the radial direction from the optical axis O, the side closer to the optical axis O refers to the radially inner side and the side farther from the optical axis O refers to the radially outer side.

The zoom lens barrel ZL is provided with a housing 22, which is a stationary member, and an image sensor holder 21 which is fixed to the rear of the housing 22. The low-pass filter 25 and the image sensor 26 are integrated as a single unit that is fixed to the image sensor holder 21 so that the low-pass filter 25 and the light-receiving surface of the image sensor 26 face forward.

The third lens group LG3 serves as a focusing lens group of the zoom lens barrel ZL and is held by a third lens group frame 51. The third lens group frame 51 is supported by the housing 22 to be linearly movable in the optical axis direction relative to the housing 22 via guide shafts (not shown). The third lens group frame 51 can be moved forward and rearward by a driving force of an AF motor 160 (see FIG. 18).

The zoom lens barrel ZL is provided inside the housing 22 with a power-varying lens-group unit separately from the above described supporting/driving devices for the third lens group frame 51. This power-varying lens-group unit is driven by a barrel-driving motor 150 (see FIG. 18) and includes a cam ring 11, an advancing barrel 12, a linear guide ring 13 and a second lens group unit 80.

The cam ring 11 and the advancing barrel 12 constitute external barrels of the zoom lens barrel ZL. The cam ring 11 is provided with a plurality of guide projections (not shown) which are slidably engaged in a plurality of cam-ring guide grooves 22a formed on an inner peripheral surface of the housing 22. The cam ring 11 is rotated by the driving force of the barrel-driving motor 150 via a zoom gear (not shown) which is driven to rotate by the barrel-driving motor 150. This rotation of the cam ring 11 causes the cam ring 11 to move in the optical axis direction while rotating and while also being guided by the cam-ring guide grooves 22a. The linear guide ring 13 is positioned inside the housing 22 and supported thereby. The linear guide ring 13 is guided linearly in the optical axis direction via a plurality of linear guide grooves (not shown) formed on an inner surface of the housing 22, and is coupled to the cam ring 11 to allow the cam ring 11 to rotate relative to the linear guide ring 13 and to move integrally with the cam ring 11 in the optical axis direction.

Figure 3:
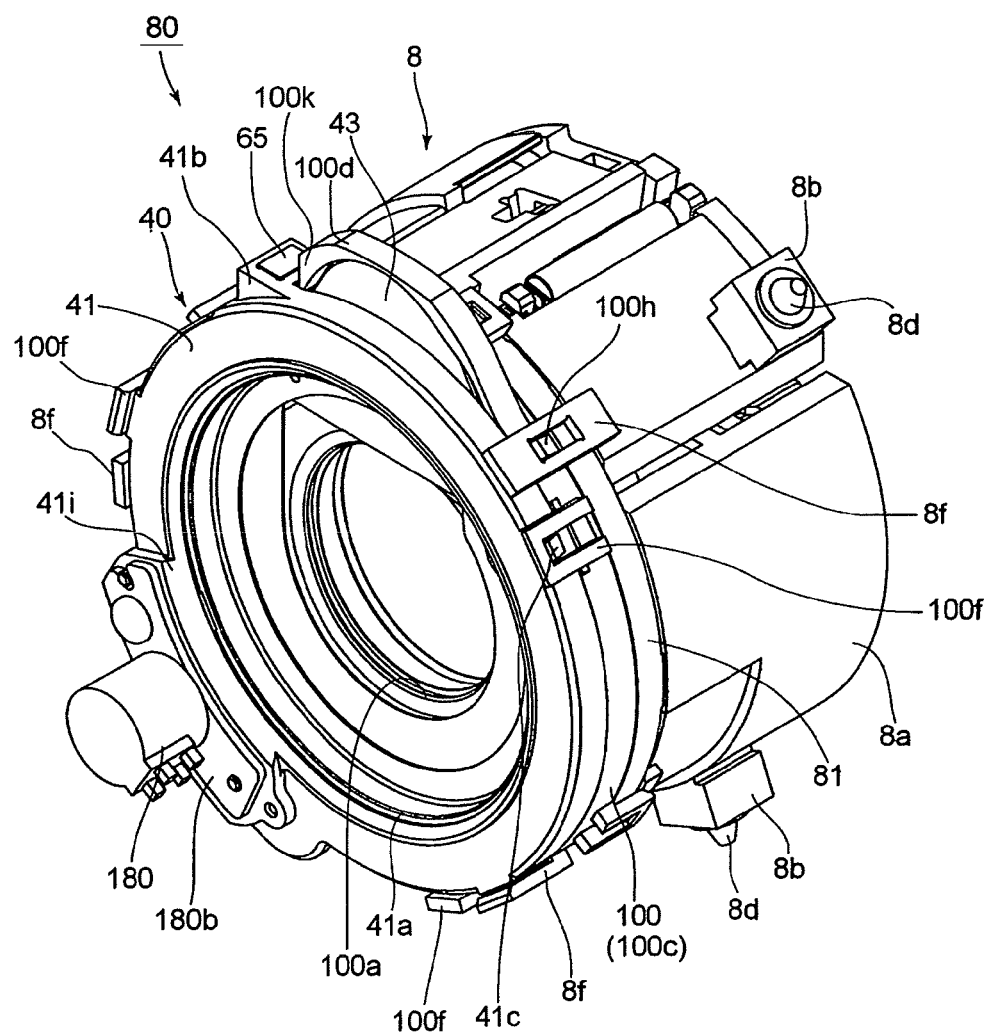
FIG. 3 is a perspective view of a second lens group unit as a component of the zoom lens barrel.
Figure 4:
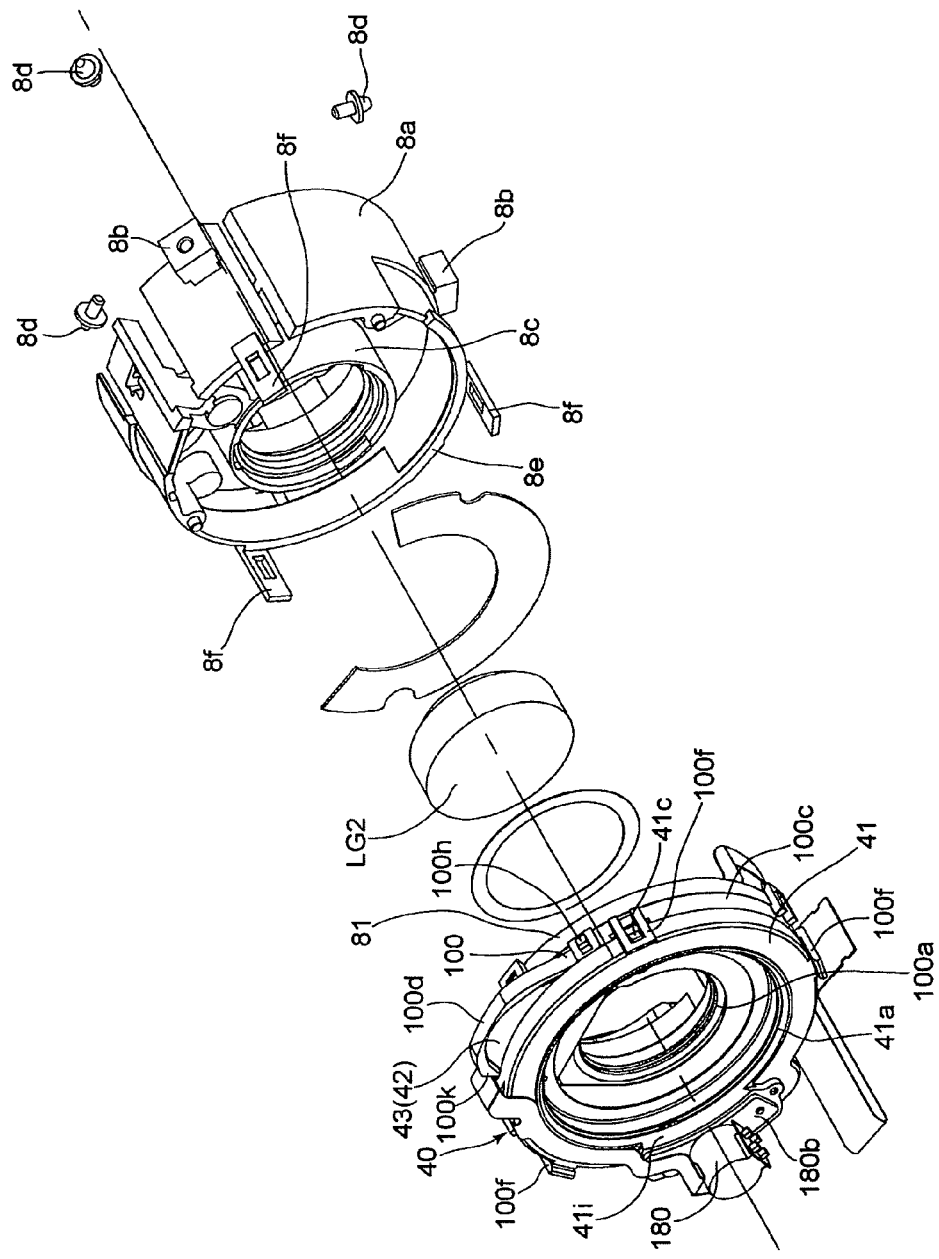
FIG. 4 is an exploded perspective view of the second lens group unit.

As shown in FIGS. 3 and 4, the second lens group unit 80 is constructed such that a polarizing filter unit 40 is fixed to the front of a second lens group moving ring 8, provided radially inside the linear guide ring 13. The second lens group unit 80 is guided linearly in the optical axis direction by slide engagement of three linear guide keys 8b of the second lens group moving ring 8 with three linear guide slots (not shown) formed through the linear guide ring 13 and elongated in the optical axis direction. The second lens group moving ring 8 is provided with a cylindrical portion 8a which constitutes a body of the second lens group moving ring 8, and the guide keys 8b project radially outwards from the cylindrical portion 8a in the vicinity of the rear end thereof to be respectively engaged in the linear guide slots (not shown) of the linear guide ring 13. The three linear guide keys 8b are arranged at different circumferential positions of the second lens group moving ring 8. Two of these three linear guide keys 8b are shown in FIGS. 3 and 4.

The second lens group LG2 is held by a holding frame portion 8c which is formed on the second lens group moving ring 8 to be positioned in the cylindrical portion 8a. The polarizing filter unit 40 and a shutter unit 81 are mounted to the front of the second lens group moving ring 8. The shutter unit 81 is provided therein with a shutter S (see FIGS. 1 and 2) which is driven by an actuator to open and shut. The polarizing filter unit 40 can insert and remove the polarizing filter 43 into and from an optical path on the optical axis O and can rotate the polarizing filter 43 inserted into the optical path about the optical axis O. The details of this operation will be discussed later.

Three second-lens-group control cam followers 8d are fixed to the three linear guide keys 8b to project radially outwards to be slidably engaged in three second-lens-group control cam groove CG2 formed on an inner peripheral surface of the cam ring 11, respectively. Since the second lens group moving frame 8 (the second lens group unit 80) is guided linearly in the optical axis direction via the linear guide ring 13, rotation of the cam ring 11 causes the second lens group moving frame 8 (i.e., the second lens group unit 80) to move in the optical axis direction in a predetermined moving manner while the second-lens-group control cam followers 8d are guided by the second-lens-group control cam groove CG2.

The first lens group LG1 is held by the advancing barrel 12 therein. The advancing barrel 12 is guided linearly in the optical axis direction with linear guide keys (not shown) which are formed on an inner peripheral surface of the advancing barrel 12 slidably engaged in linear guide grooves (not shown) which are formed on the linear guide ring 13. The advancing barrel 12 is provided, on an outer peripheral surface thereof in the vicinity of the rear end of the advancing barrel 12, with a plurality of first-lens-group control cam followers 12a which are slidably engaged in a plurality of first-lens-group control cam groove CG1 formed on an inner peripheral surface of the cam ring 11, respectively. Since the advancing barrel 12 is guided linearly in the optical axis direction via the linear guide ring 13, rotation of the cam ring 11 causes the advancing barrel 12 to move in the optical axis direction in a predetermined moving manner while the first-lens-group control cam followers 12a are guided by the second-lens-group control cam groove CG1.

Figure 18:
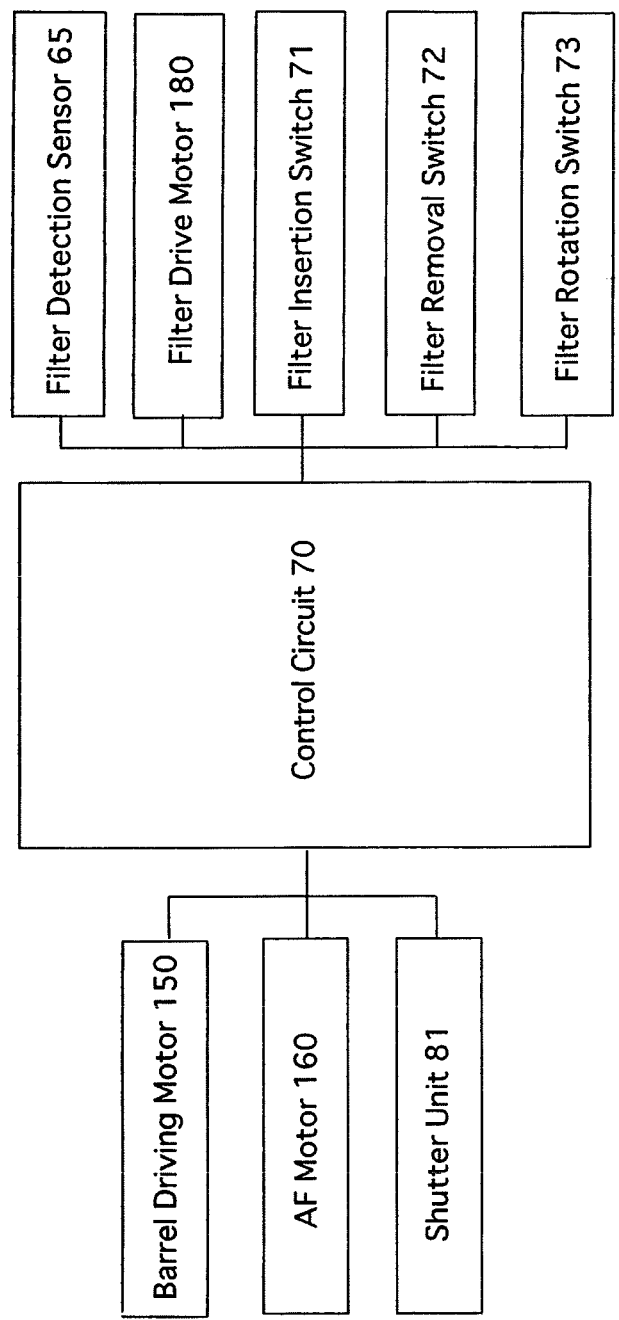
FIG. 18 is a schematic block diagram of a portion of the electrical components of a camera incorporating the zoom lens barrel shown in FIGS. 1 and 2.

FIG. 18 conceptually shows part of the electrical components of a camera incorporating the zoom lens barrel ZL. Operations of the barrel-driving motor 150, the AF motor 160 and the shutter unit 81 are controlled by a control circuit 70. In addition, the control circuit 70 performs control operations on the polarizing filter unit 40 which will be discussed later.

Operations of the zoom lens barrel ZL that has the above described structure will be discussed hereinafter. When the zoom lens barrel ZL is in a ready-to-photograph state (in a zoom range) shown in FIG. 1, the cam ring 11 is advanced in the optical axis direction with respect to the housing 22, and the amount of advancement of the cam ring 11 is controlled by the contours of the cam-ring guide grooves 22a. The advancing barrel 12, which supports the first lens group LG1, and the second lens group unit 80, which supports the second lens group LG2, move relative to each other in the optical axis direction while being guided by the first-lens-group control cam grooves CG1 and the second-lens-group control cam grooves CG2, respectively, in accordance with rotation of the cam ring 11.

Driving the barrel-driving motor 150 in the lens barrel retracting direction from the ready-to-photograph state shown in FIG. 1 causes the cam ring 11 that is guided by the cam-ring guide grooves 22a to move rearward in the optical axis direction while rotating. In addition, this driving of the barrel-driving motor 150 causes the advancing barrel 12 and the second lens group unit 80 (the second lens group moving frame 8) to move rearward with the cam ring 11 in the optical axis direction with predetermined relative movement between the advancing barrel 12 and the second lens group unit 80 that is determined by the contours (cam profiles) of the first-lens-group control cam groove CG1 and the second-lens-group control cam groove CG2. Thereafter, immediately after the zoom lens barrel ZL reaches the lens barrel accommodated state shown in FIG. 2, the barrel-driving motor 150 stops driving in the lens barrel retracting direction. In addition, the position of the third lens group frame 51 that holds the third lens group LG3 is controlled by the AF motor 160 to bring the third lens group frame 51 to the retracted position shown in FIG. 2.

Figure 5:
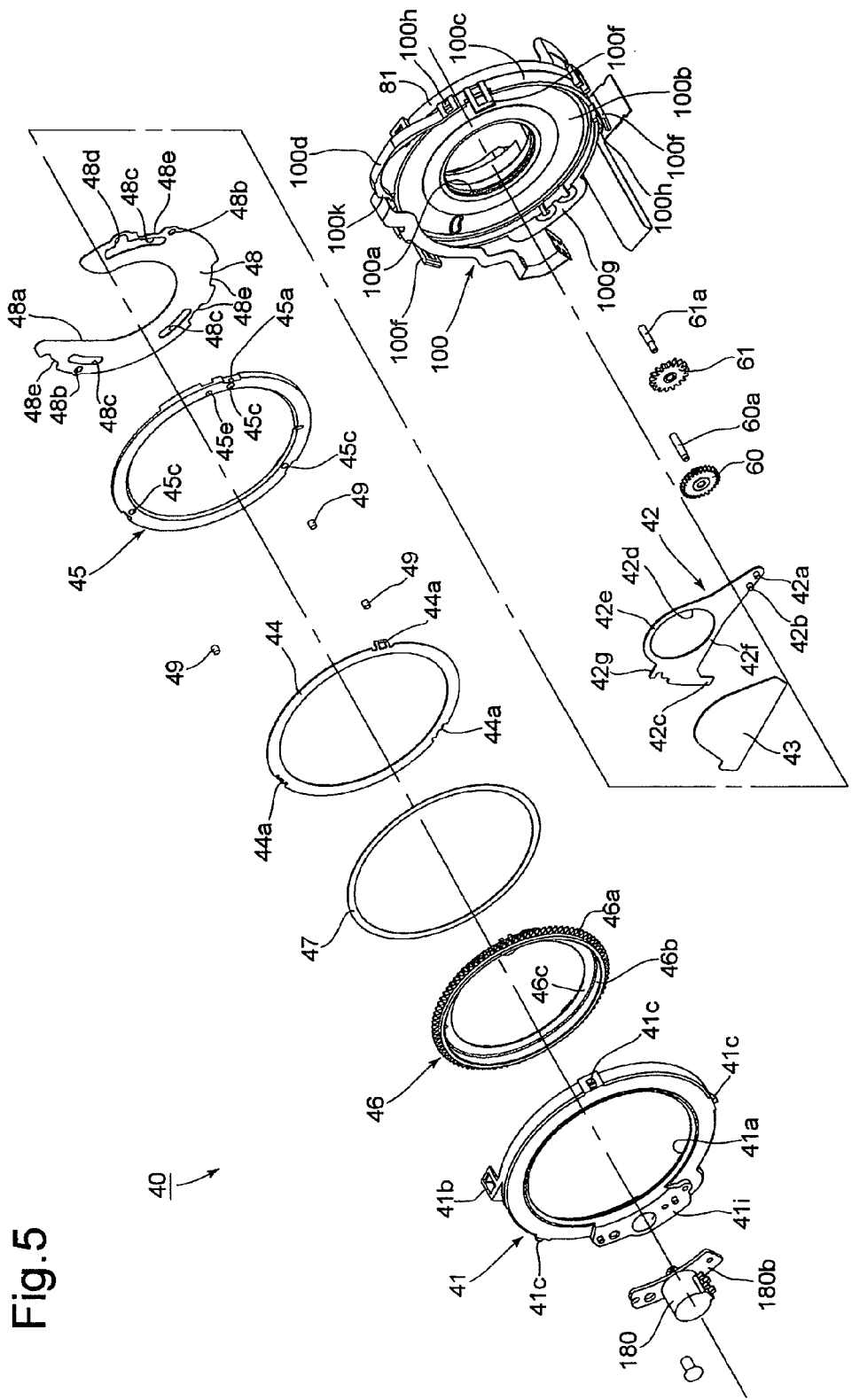
FIG. 5 is an exploded perspective view of a polarizing filter unit contained in the second lens group unit.

The polarizing filter 43 that is held by the polarizing filter unit 40 can be inserted into and retracted from a position in front of the second lens group LG2, as desired, and can also be made to rotate about the optical axis O. The detailed structure of the polarizing filter unit 40 that holds and drives the polarizing filter 43 will be discussed hereinafter. As shown in FIG. 5, the polarizing filter unit 40 is structured to hold a filter frame (holding member) 42, the polarizing filter 43, an annular friction plate (rotational driven member) 44, a rotational ring (rotational driven member) 45, a driving ring (rotational driving member) 46, a friction sheet 47, a protection sheet (rotational driven member) 48 and three resistance applying springs (resistance applier/biaser) 49 between a base member (support member) 100 and a motor support member (support member) 41.

Figure 6:
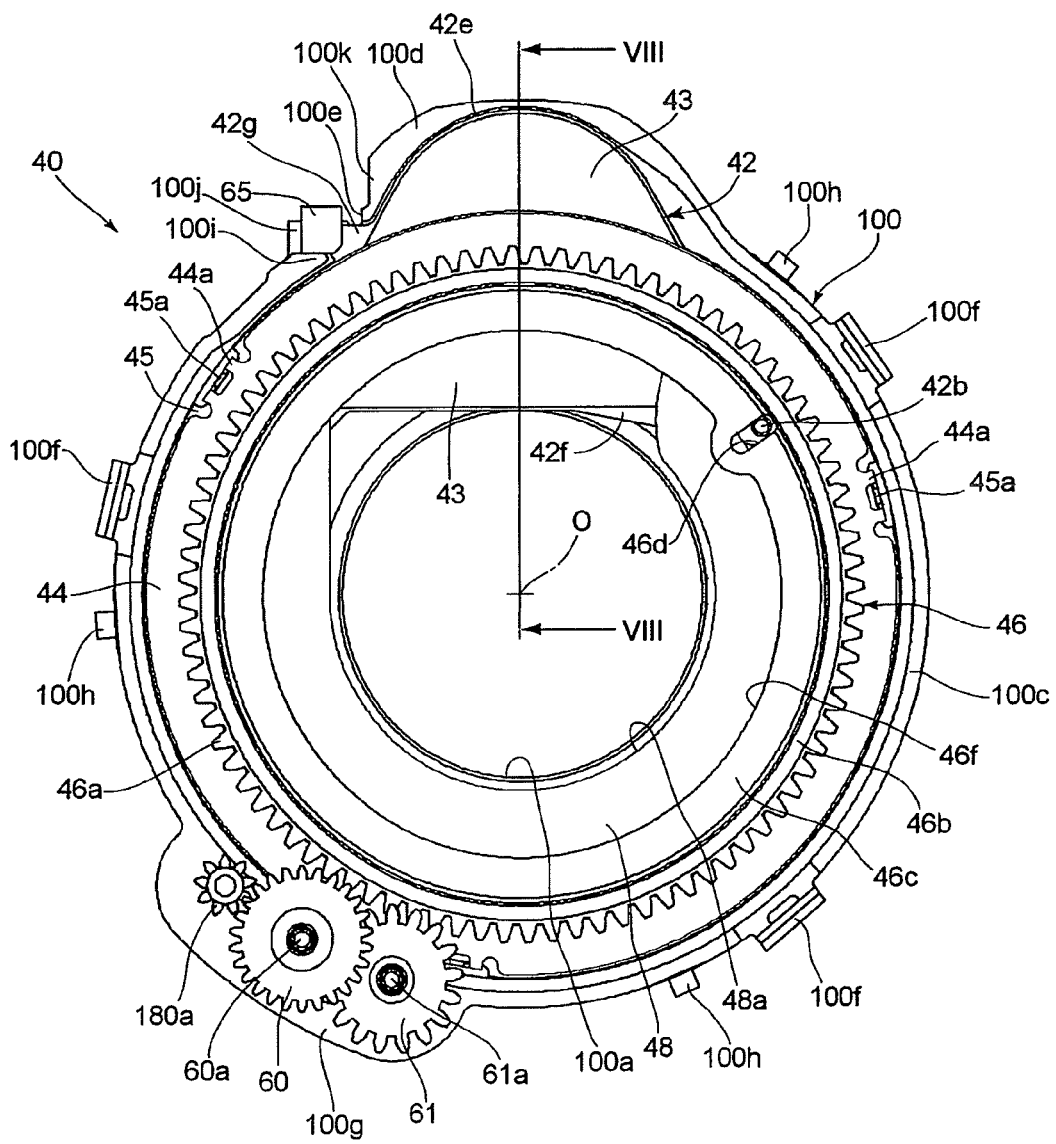
FIG. 6 is a front elevational view of the polarizing filter unit in a polarizing filter removed state, with a motor support member omitted, viewed from the front in an optical axis direction.
Figure 9:
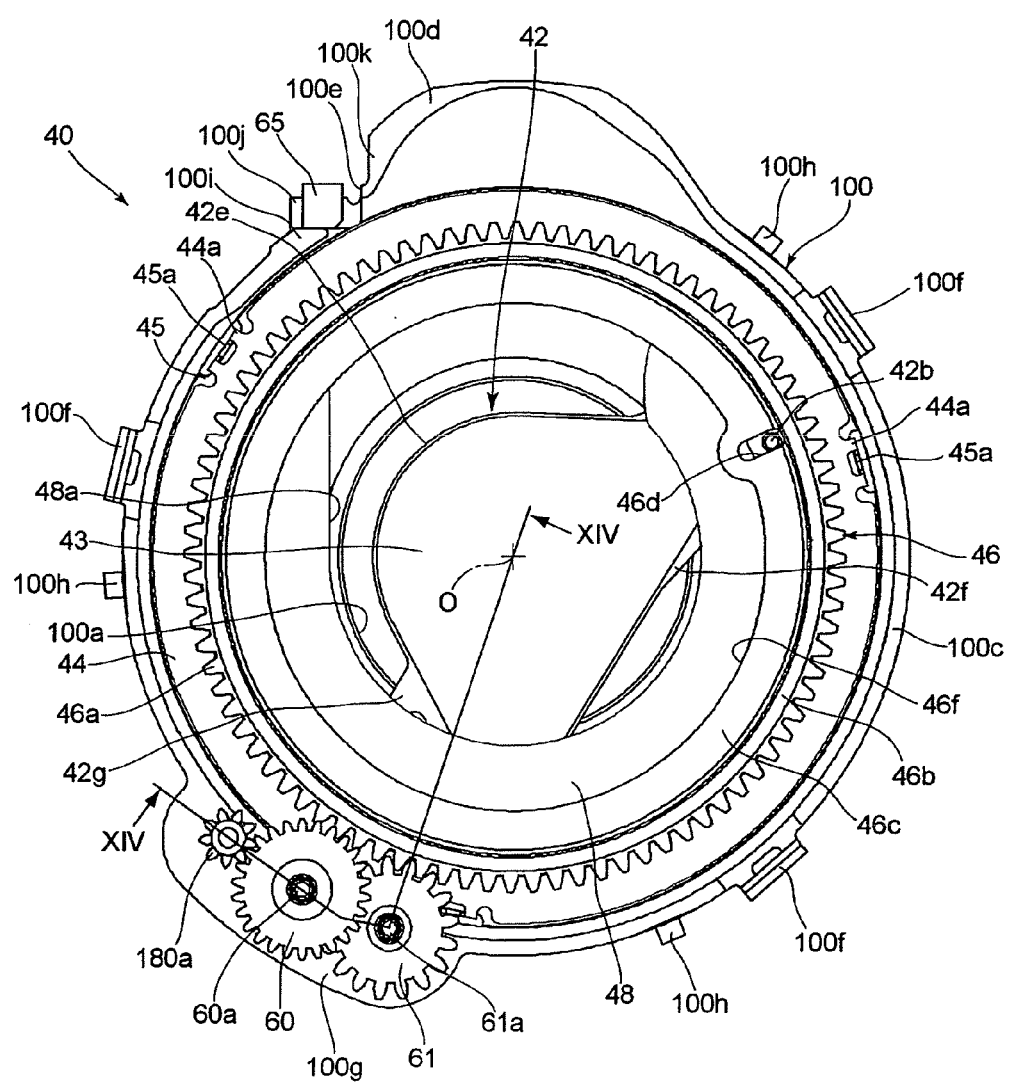
FIG. 9 is a front elevational view of the polarizing filter unit in a polarizing filter inserted state, with the motor support member omitted, viewed from the front in the optical axis direction.

The base member 100 has an annular shape which surrounds a circular central opening 100a with its center on the optical axis O. The base member 100 is provided around the central opening 100a with a support surface 100b which is formed to lie in a plane substantially orthogonal to the optical axis O and to face toward the front. The base member 100 is provided radially outside the support surface 100b with an outer surrounding wall (an element of a removal controller/cylindrical wall) 100c. The outer surrounding wall 100c is a cylindrical wall which projects forward from the support surface 100b and includes an inner wall surface (inner peripheral surface) having a constant diameter about the optical axis O. The base member 100 is provided with a filter-accommodating wall (an element of the removal controller/accommodating wall portion/guide surface) 100d which is continuously formed with the outer surrounding wall 100c. The filter-accommodating wall 100d is a wall which projects further radially-outward than the outer surrounding wall 100c and includes a partially-cylindrical inner wall surface (inner peripheral surface) which is greater in curvature (i.e., has a smaller radius of curvature) than the outer surrounding wall 100c. As shown in FIGS. 6 and 9, the base member 100 is provided in the vicinity of the boundary between the filter-accommodating wall 100d and the outer surrounding wall 100c with a sensor hole 100e which extends through the base member 100 in a radial direction thereof. A limit wall 100i is formed as a part of the outer surrounding wall 100c on an edge of the outer surrounding wall 100c which faces the sensor hole 100e. The base member 100 is provided, outside the outer surrounding wall 100c at different circumferential positions, with three lock lugs 100f and three lock projections 100h. Each of the three lock lugs 100f projects forward and has a through-hole extending in a radial direction of the base member 100.

The shutter unit 81 is fixed to the back of the base member 100. The shutter unit 81 is provided with an annular portion having an outer diameter substantially identical to the outer diameter of the outer surrounding wall 100c of the base member 100. The shutter blades of the shutter S are accommodated in this annular portion of the shutter unit 81 when opened; when closed, the shutter blades of the shutter S project radially inwards from the annular portion of the shutter unit 81. The shutter unit 81 is provided in the rear thereof with a shutter actuator 82 which projects rearward (see FIGS. 1 and 2). The shutter actuator 82 operates to drive the shutter S. Although the base member 100 and the shutter unit 81 are shown as an integrated component in FIGS. 1 and 2, in reality the base member 100 and the shutter unit 81 are made as separate members that are fixed to each other afterwards. It should be noted that the shutter unit 81 can be omitted in the present invention; namely, the polarizing filter unit 40 can be made independently of the shutter unit 81, i.e., without being combined with the shutter unit 81.

The motor support member 41 is an annular member having an outer diameter size corresponding to the base member 100. The motor support member 41 is provided on a radially inner side with a front opening 41a which is greater in diameter than the central opening 100a. The motor support member 41 is provided on an outer periphery thereof with a sensor support portion 41b formed at a position corresponding to the sensor hole 100e of the base member 100. The motor support member 41 is provided, at positions corresponding to the three lock lugs 100f, with three lock projections 41c, respectively. The motor support member 41 and the base member 100 are coupled to each other by making the three lock projections 41c engaged in the holes of the three lock lugs 100f, respectively. A filter detection sensor 65 is held by the sensor support portion 41b of the motor support portion 41 therein. The filter detection sensor 65 is also supported by the limit wall 100i and the sensor support lug 100j of the base member 100 in a combined state (which will be discussed later) of the motor support member 41 and the base member 100. The filter detection sensor 65 is a photo interrupter having a combination of a light emitter and a light receiver which are spaced from each other in the optical axis direction. The filter detection sensor 65 detects whether or not light emitted from the light emitter is incident on the light receiver and outputs a detection signal to the controller 70.

As shown in FIGS. 11 through 14, an insertion limit surface 41*d* is formed on an inner peripheral surface of the motor support member 41 to be positioned behind the front opening 41*a*, and a rotational guide surface 41*e* and a rotational guide surface 41*f* are formed on an inner peripheral surface of the motor support member 41 to be positioned behind the insertion limit surface 41*d* at different positions in both a radial direction of the motor support member 41 and the optical axis direction. Each of the rotational guide surfaces 41*e* and 41*f* is formed in the shape of an inner cylindrical surface with its center on the optical axis O, and the rotational guide surface 41*f* that is provided at a rearward position with respect to the rotational guide surface 41*e* in the optical axis direction is greater in diameter than the rotational guide surface 41*e*. A circumferential fitting portion 41*g*, onto which the front end of the outer surrounding wall 100*c* is fitted, is formed on a portion of the motor support member 41 which is positioned on the radially outer side of the rotational guide surface 41*f*. In addition, an abutting protrusion 41*h* is projected rearward from the motor support member 41 to be positioned between the rotational guide surfaces 41*e* and 41*f* in the optical axis direction. The abutting protrusion 41*h* is formed as a rearwardly protruding portion which is formed in an annular area positioned with its center on the optical axis O.

Figure 14:
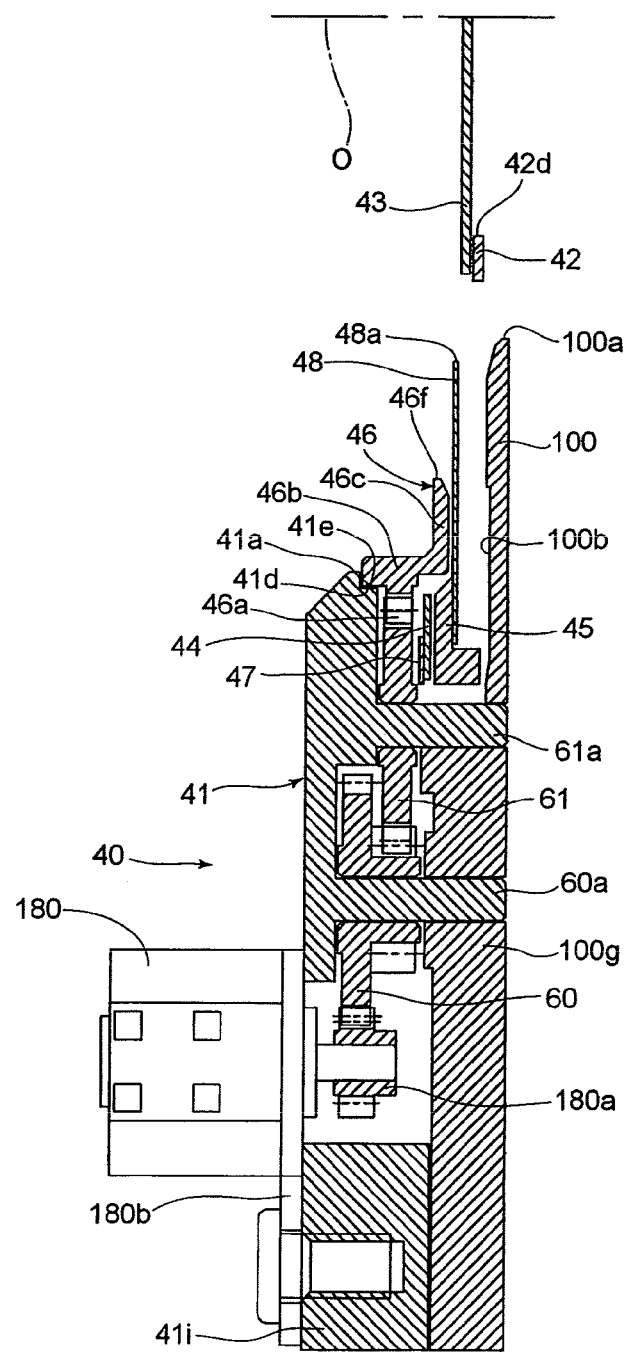
FIG. 14 is a cross sectional view taken along the line XIV-XIV shown in FIG. 9.
Figure 15A:
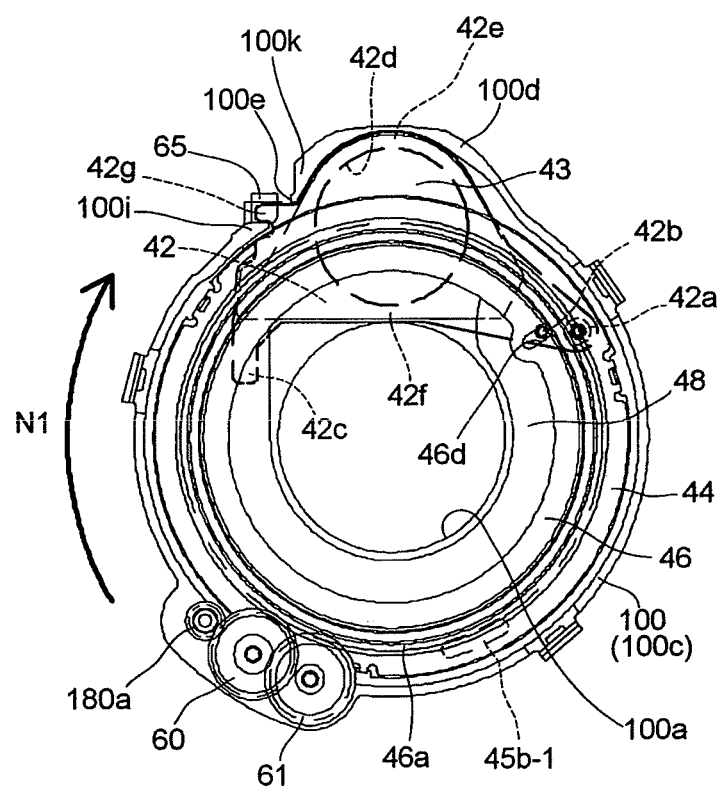
FIGS. 15A, 15B, 15C, 15D, 15E and 15F are front elevational views of the polarizing filter unit, showing a series of operations moving the polarizing filter from the polarizing filter removed state to the polarizing filter inserted state, and subsequently rotating the polarizing filter about an optical axis, in that order from FIG. 15A through FIG. 15F.
Figure 15B:
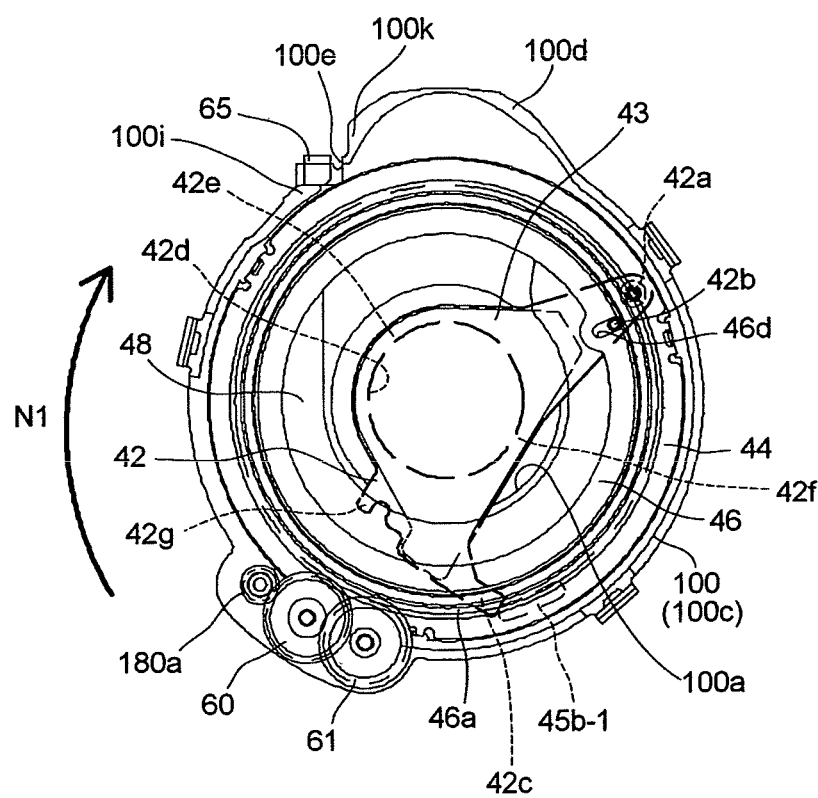
Figure 15C:
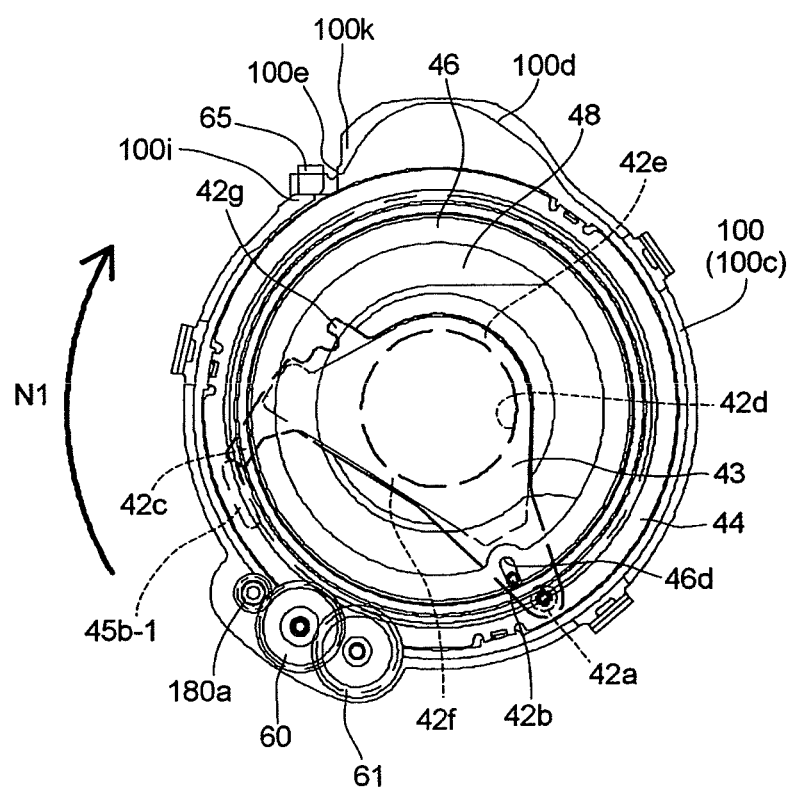
Figure 15D:
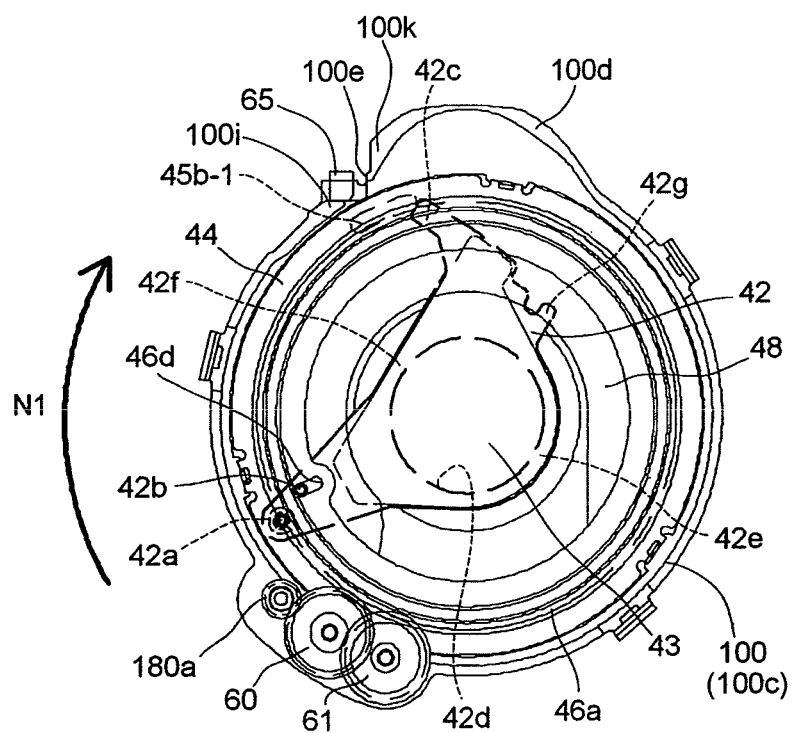
Figure 15E:
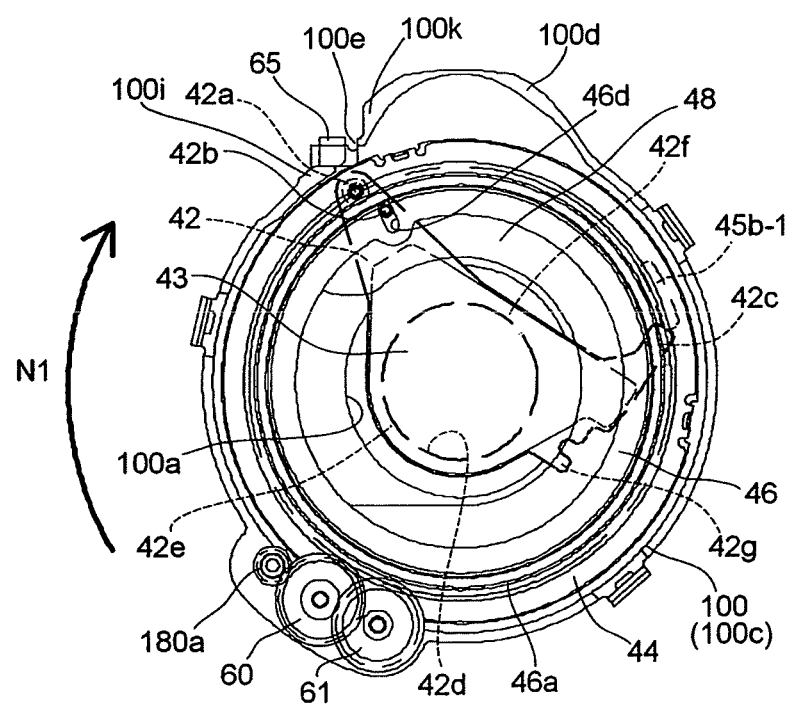
Figure 15F:
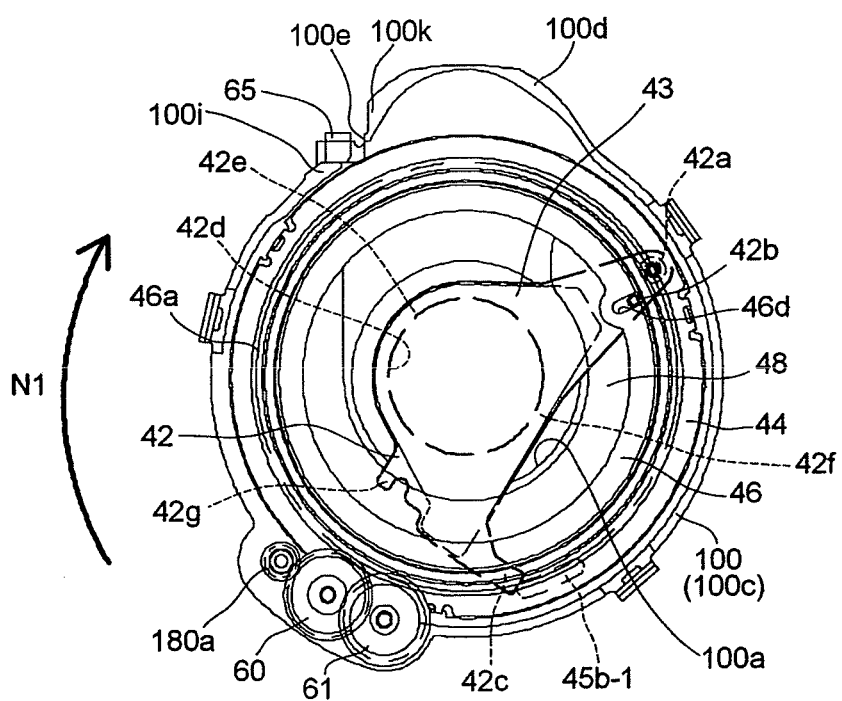

The polarizing filter unit 40 is provided, between a motor support portion 41*i* of the motor support member 41 and a gear support portion 100*g* of the base member 100, with a gear support shaft 60*a* and a gear support shaft 61*a* which are parallel to the optical axis O. A first gear 60 and a second gear 61 are fitted on the gear support shaft 60*a* and the gear support shaft 61*a*, respectively (see FIG. 14). A filter drive motor (driving source for the rotatable optical element) 180 is fixed to and supported by the front side of the motor support portion 41*i*. The operation of the filter drive motor 180 is controlled by the control circuit 70. The filter drive motor 180 is a stepping motor provided with a rotational shaft which projects in a direction parallel to the optical axis O; a pinion 180*a* is fixedly fitted on this rotational shaft, and a support plate 180*b* is fixed to an end of the motor body of the filter drive motor 180 from which the rotational shaft projects. The filter drive motor 180 is fixed to the motor support member 41 with the support plate 180*b* contacting the motor support portion 41*i*, and in this fixed state of the filter drive motor 180, the pinion 180*a* is engaged with the first gear 60 as shown in FIG. 14. The first gear 60 is a double gear including a large-diameter gear and a small-diameter gear. The pinion 180*a* is engaged with the large-diameter gear of the first gear 60 and the small-diameter gear of the first gear 60 is engaged with the second gear 61. The second gear 61 is engaged with a circumferential gear 46*a* formed on the outer periphery of the driving ring 46.

Figure 7:
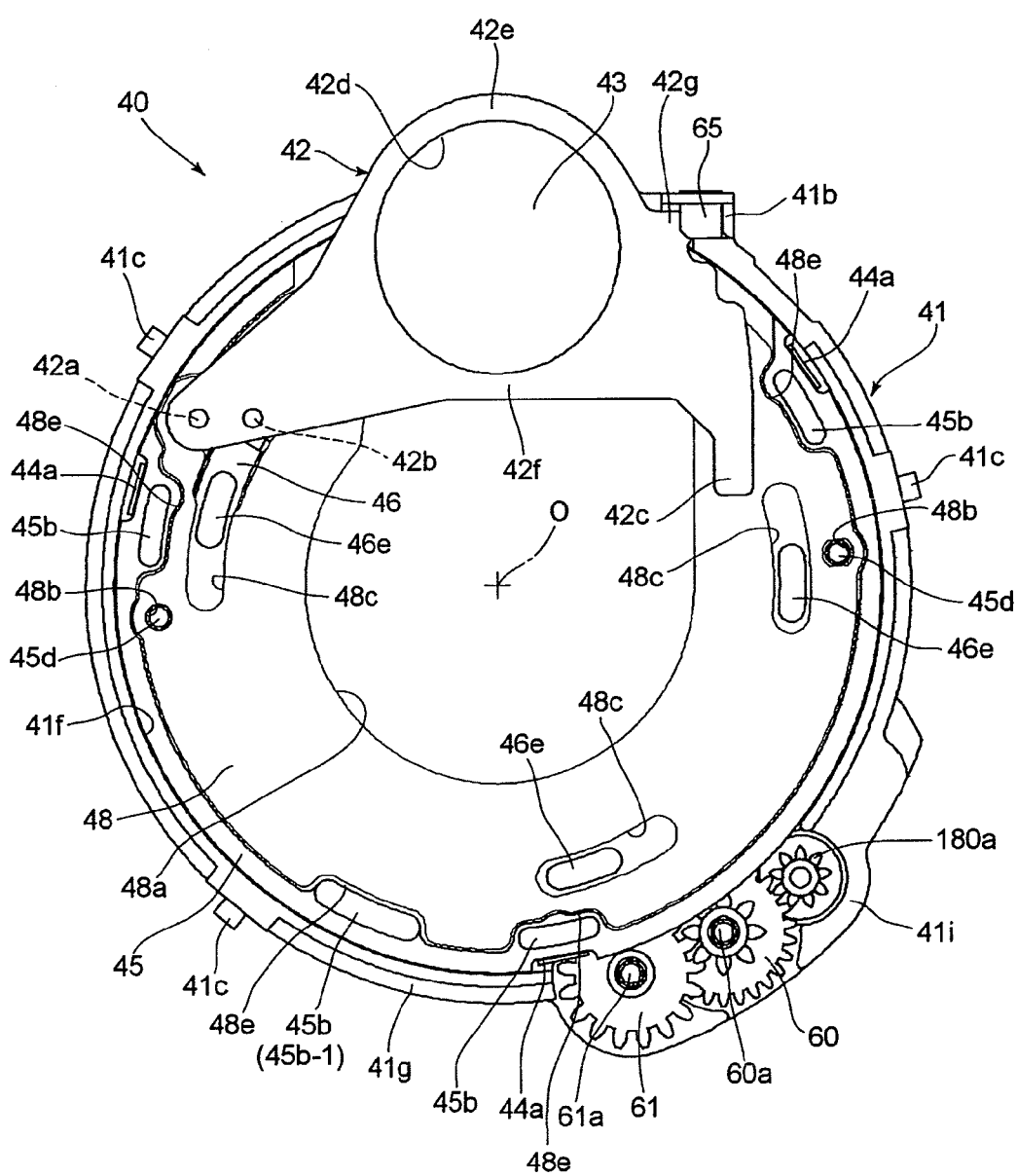
FIG. 7 is a rear elevational view of the polarizing filter unit in the polarizing filter removed state, with a base member omitted, viewed from the rear in the optical axis direction.
Figure 8:
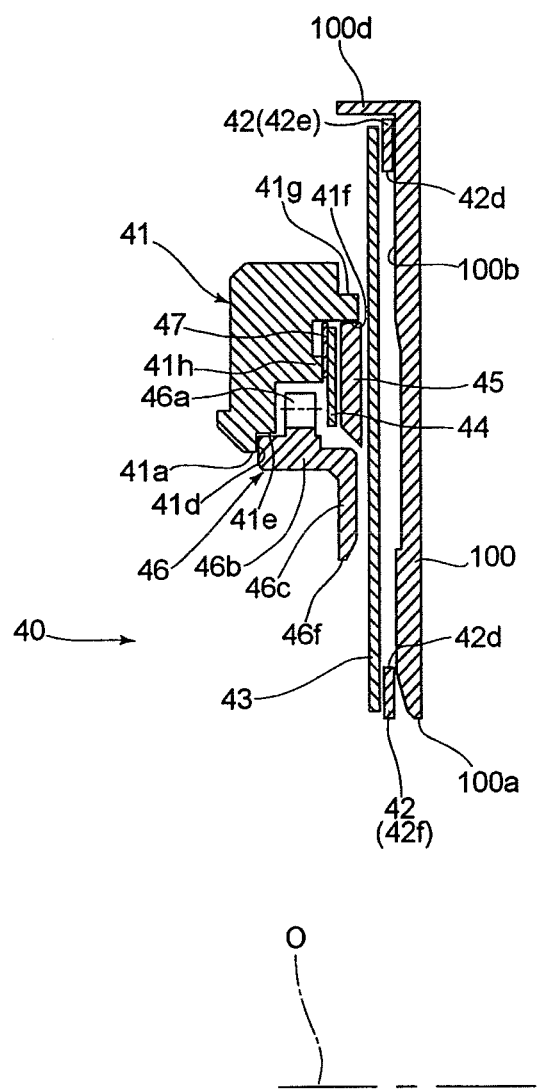
FIG. 8 is a cross sectional view taken along the line VIII-VIII shown in FIG. 6.

The driving ring 46 is provided, on the inner side thereof on the radially opposite side of the driving ring 46 from the circumferential gear 46*a*, with a rotational guide portion 46*b* which has an annular shape centered about the optical axis O, and the outer periphery of the front end of the rotational guide portion 46*b* of the driving ring 46 is slidably supported by the rotational guide surface 41*e* of the motor support member 41. The driving ring 46 is supported and guided by the rotational guide surface 41*e* to be rotatable about the optical axis O. The contact engagement of the front end of the rotational guide portion 46*b* with the insertion limit surface 41*d* in the motor support member 41 prevents the driving ring 46 from moving forward relative to the motor support member 41. The driving ring 46 is further provided with an annular flange 46*c* which extends radially inwards from the rotational guide portion 46*b* to lie in a plane orthogonal to the optical axis O, and a rotation transmission hole (elongated hole) 46*d* (see FIGS. 6, 9 and 11) is formed through the annular flange 46*c* in the optical axis direction. The radially inner edge of the annular flange 46*c* forms a central opening 46*f* that is greater in diameter than the central opening 100*a* of the base member 100. In addition, the annular flange 46*c* is provided, on the rear thereof at different circumferential positions, with three rearward projections 46*e* (see FIGS. 7, 10 and 12). The contact engagement of the rearward projections 46*e* with the support surface 100*b* of the base member 100 prevents the driving ring 46 from moving rearward (see FIG. 12). In short, by being held between the insertion limit surface 41*d* and the support surface 100*b*, the driving ring 46 is prevented from moving in the optical axis direction relative to both the motor support member 41 and the base member 100 and allowed to rotate about the optical axis O.

As shown in FIGS. 11 through 14, the rotational ring 45 is a ring member installed at a position surrounding the outside of the rotational guide portion 46*b* of the driving ring 46. The outer periphery of the rotational ring 45 is slidably supported by the motor support member 41 to be slidable on the rotational guide surface 41*f* of the motor support member 41. The rotational ring 45 is supported by the motor support member 41 to be rotatable about the optical axis O while being guided by the rotational guide surface 41*f*. The annular friction plate 44 is positioned in front of the rotational ring 45, and the friction sheet 47 is positioned in front of the annular friction plate 44. Each of the annular friction plate 44 and the friction sheet 47 is an annular thin-plate member that is positioned with its center on the optical axis O and has a diameter corresponding to the diameter of the rotational ring 45. The annular friction plate 44 and the rotational ring 45 are coupled to each other by engagement of three engaging projections 45*a* which are formed on the outer periphery of the rotational ring 45 with three engaging lugs 44*a* which are formed on the annular friction plate 44, respectively (see FIG. 12). More specifically, a slit into which the associated engaging projection 45*a* is inserted is formed in each engaging lug 44*a*. The length of the slit of each engaging lug 44*a* in the optical axis direction is determined to allow the associated engaging projection 45*a* to move slightly in the optical axis direction relative to the engaging lug 44*a*. On the other hand, each engaging projection 45*a* is engaged in the slit of the associated engaging lug 44*a* while being prevented from moving in the circumferential direction about the optical axis O relative to the engaging lug 44*a*. Namely, the rotational ring 45 and the annular friction plate 44 are coupled to each other to be integrated in the rotational direction and to be allowed to move slightly relative to each other in the optical axis direction. The friction sheet 47 is inserted in between the annular friction plate 44 and the abutting protrusion 41*h* of the motor support member 41, and the contact engagement of the friction sheet 47 with the abutting protrusion 41*h* of the motor support member 41 prevents the annular friction member 44 (a combination of the annular friction member 44 and the rotational ring 45) from moving forward.

Figure 12:
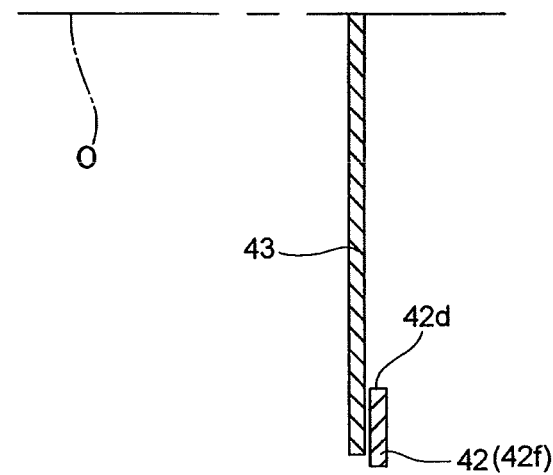
FIG. 12 is a cross sectional view taken along the line XII-XII shown in FIG. 10.
Figure 12:
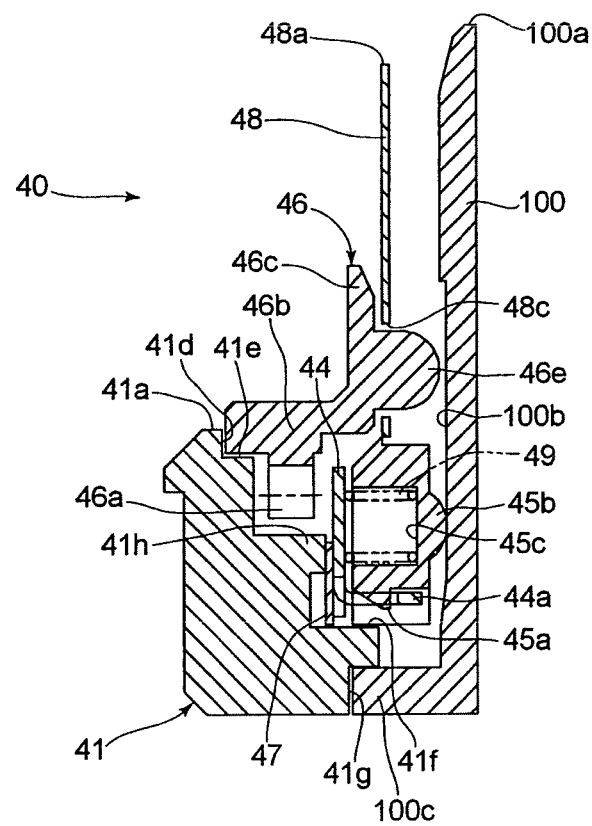
Figure 13:
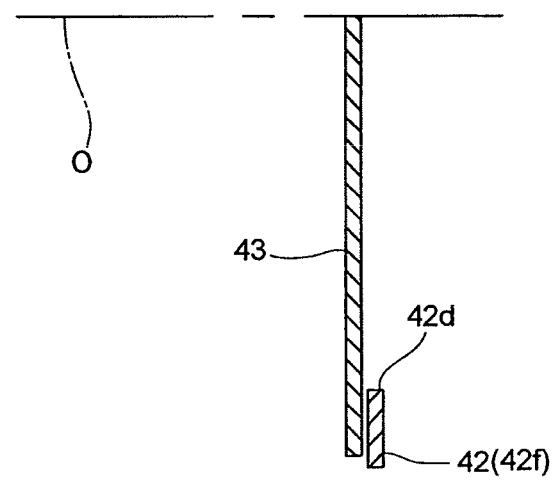
FIG. 13 is a cross sectional view taken along the line XIII-XIII shown in FIG. 10.
Figure 13:
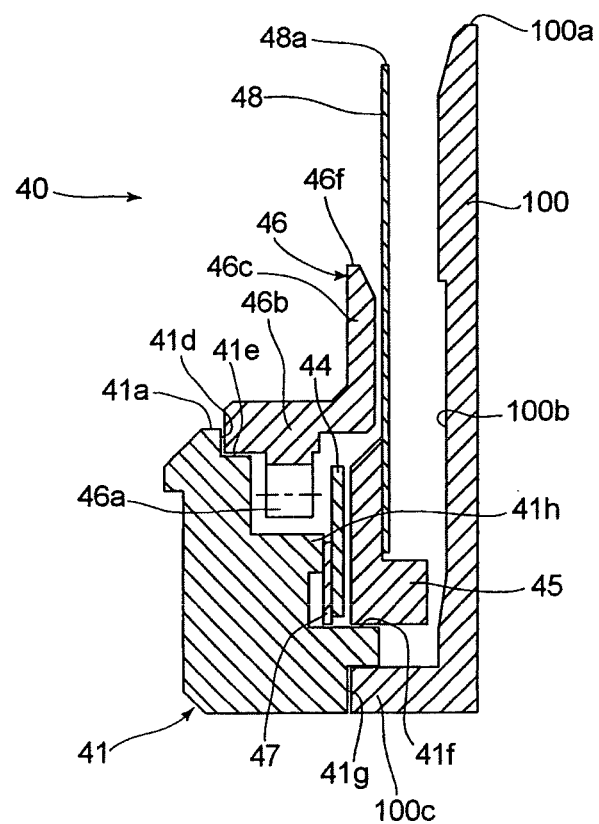

On the other hand, the rotational ring 45 is prevented from moving rearward by making a plurality of (four) rearward projections 45*b* which are formed on the rear surface of the rotational ring 45 come in contact with the support surface 100*b* of the base member 100 (see FIG. 12). Namely, the rotational ring 45 lies at a position in the optical axis direction where the rotational ring 45 is held between the abutting protrusion 41*h* of the motor support member 41 and the support surface 100b of the base member 100, and the annular friction plate 44 and the friction sheet 47 are inserted in between the abutting protrusion 41h and the rotational ring 45. The rotational ring 45 is provided at different positions in the circumferential direction thereof with three spring support holes 45c which are open toward the front, and the three resistance applying springs 49 are inserted into the spring support holes 45c, respectively (see FIG. 12). Each of the resistance applying springs 49 is a compression coil spring, the front and rear ends of which are in contact with the annular friction plate 44 and the base of the associated spring support hole 45c to bias the annular friction plate 44 and the rotational ring 45 in opposite directions away from each other in the optical axis direction. Namely, the resistance applying springs 49 bias the annular friction plate 44 and the rotational ring 45 forward and rearward, respectively. Due to the biasing force of the resistance applying springs 49, the friction sheet 47 is pressed against the abutting protrusion 41h, while the rearward projections 45b of the rotational ring 45 are pressed against the support surface 100b, so that a predetermined magnitude of frictional resistance is applied to the combination of the annular friction plate 44 and the rotational ring 45 in the rotational direction about the optical axis O. The friction sheet 47 is for adjusting the magnitude of the friction applied to the annular friction plate 44; however, if a sufficient friction is gained between the annular friction plate 44 and the abutting protrusion 41h, it is possible to omit the friction sheet 47.

The filter frame 42 is a thin plate member having an approximately semicircular shape. The filter frame 42 is provided in the vicinity of one end thereof with a first support shaft (pivotal support portion) 42a and a second support shaft (rotation transmission portion) 42b, and the filter frame 42 is provided in the vicinity of the other end thereof with a stopper projection (an element of an insertion controller/contact portion) 42c. The stopper projection 42c is hook shaped and bends radially inwards. The filter frame 42 is provided in the center thereof with a circular filter opening 42d, and is also provided on the radially outer and inner sides (radially opposite sides) of the circular filter opening 42d with an outer diameter side edge (an element of the removal controller/removal limit portion) 42e and an inner diameter side edge 42f, respectively. The outer diameter side edge 42e is curved radially outwards in a circular arc shape, and the inner diameter side edge 42f is substantially linear in shape. In addition, the filter frame 42 is provided at a position adjacent to the outer diameter side edge 42e with a sensor pass-through projection 42g. The sensor pass-through projection 42g is a projection which is formed integral with the body of the filter frame 42 to extend along a plane orthogonal to the optical axis O. The polarizing filter 43 is fixed to the front of the filter frame 42. The polarizing filter 43 is shaped to cover the entirety of the filter opening 42d and not to overlap any of the following portions or the filter frame 42: the first support shaft 42a, the second support shaft 42b, the stopper projection 42c and the sensor pass-through projection 42g.

Figure 11:
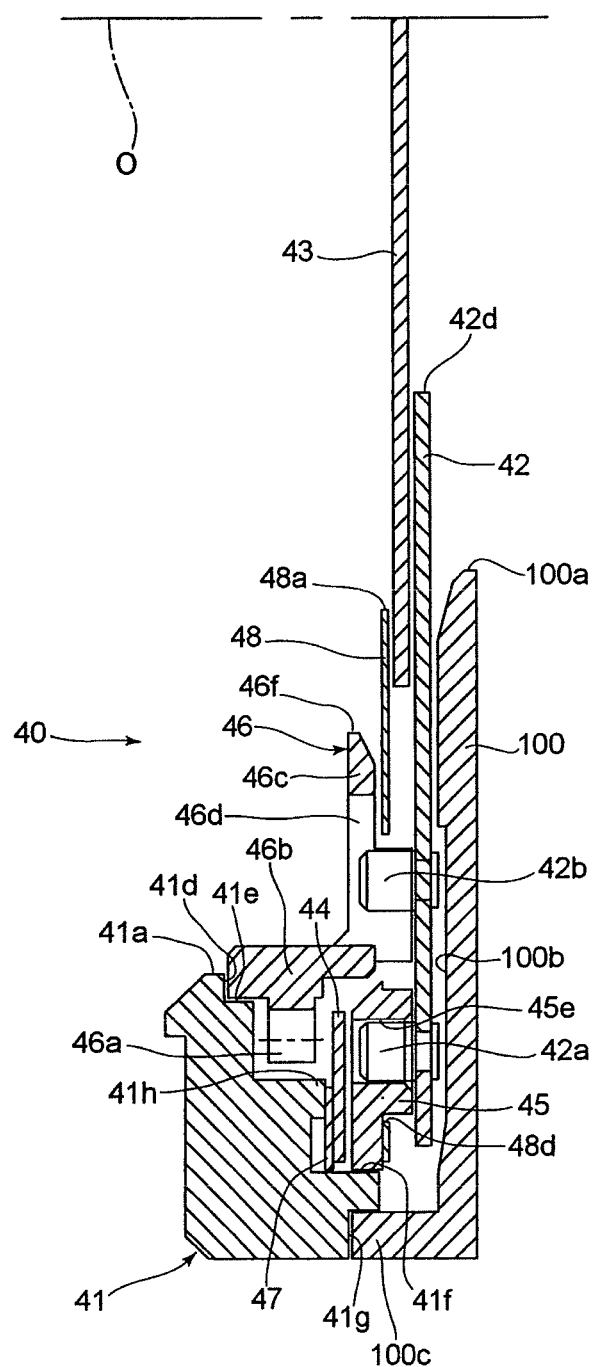
FIG. 11 is a cross sectional view taken along the line XI-XI shown in FIG. 10.

As shown in FIG. 11, the first support shaft 42a of the filter frame 42 is inserted into a shaft bearing hole 45e formed in the rotational ring 45. The outer periphery of the first support shaft 42a is in the shape of a cylinder, while the inner periphery of the shaft bearing hole 45e is in the shape of a cylinder to correspond to the cylindrical shape of the outer periphery of the first support shaft 42a. With this structure, the filter frame 42 is supported by the rotational ring 45 to be rotatable (swingable) about the first support shaft 42a relative to the rotational ring 45. The second support shaft 42b of the filter frame 42 is fitted into the rotation transmission hole 46d of the driving ring 46. As shown in FIGS. 6 and 9, the outer periphery of the second support shaft 42b is in the shape of a cylinder, whereas the rotation transmission hole 46d is formed as a slotted hole elongated in a radial direction with respect to the optical axis O, so that a rotational force of the driving ring 46 is transmitted to the second support shaft 42b with the second support shaft 42b held between a pair of circumferentially-opposed inner surfaces of the rotation transmission hole 46d. Namely, due to the engagement between the second support shaft 42b and the rotation transmission hole 46d, the filter frame 42 rotates with the driving ring 46 about the optical axis O. Since the rotation transmission hole 46d is formed as a radially elongated hole, the filter frame 42 is allowed to move slightly in a radial direction of the filter frame 42 relative to the driving ring 46.

Figure 10:
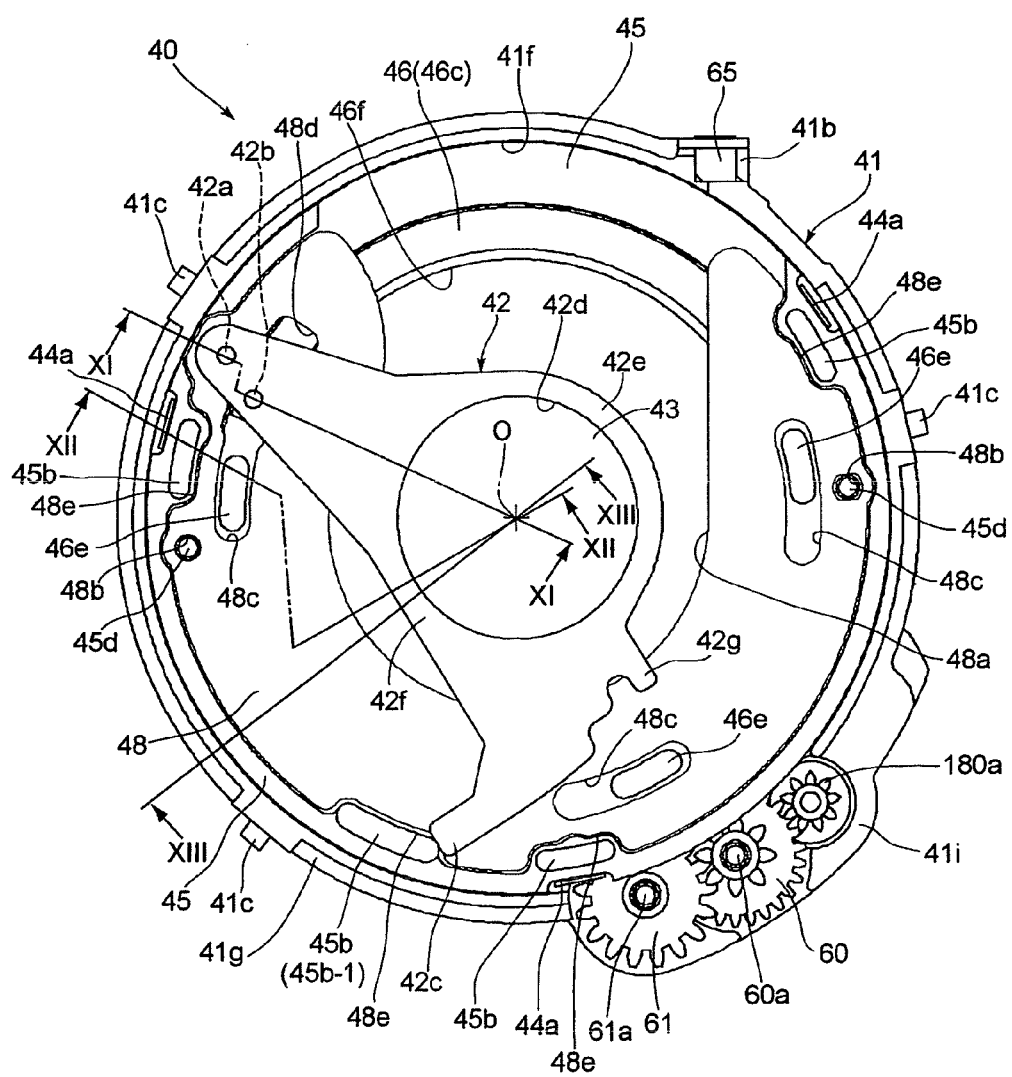
FIG. 10 is a rear elevational view of the polarizing filter unit in the polarizing filter inserted state, with the base member omitted, viewed from the rear in the optical axis direction.

The filter frame 42 is movable (rotatable) between an inserted position (shown in FIGS. 9, 10, 15B through 15F, 16C through 16E, and 17A), in which the center of the filter opening 42d is coincident with the optical axis O, and a fully removed position (shown in FIGS. 6, 7, 15A, 16A and 17F), in which the filter opening 42d is fully removed from an optical path on the optical axis O, by operations of the rotational ring 45 and the driving ring 46 which will be discussed later. When the filter frame 42 is in the fully removed position, the outer diameter side edge 42e is in the close vicinity of the inner peripheral surface of the filter-accommodating wall 100d, thus being prevented from further rotating in the direction away from the optical axis O (i.e., radially outward direction) by engagement with the filter-accommodating wall 100d. When the outer diameter side edge 42e is at a position in the rotational direction about the optical axis O which does not correspond to the position of the filter-accommodating wall 100d, the filter frame 42 is prevented from further rotating in the direction away from the optical axis O (i.e., radially outward direction) by engagement with the inner peripheral surface of the outer surrounding wall 100c at a limited removed position that is closer to the optical axis O than the fully removed position (i.e., that is located radially more inward than the fully removed position) as shown in FIGS. 17B through 17D. As shown in FIG. 12, the filter frame 42 and the rearward projections 45b of the rotational ring 45 are located at the same position in the optical axis direction (i.e., lie in a plane orthogonal to the optical axis O) in a state where the filter frame 42 is supported by the rotational ring 45 and the driving ring 46, and rotating the filter frame 42 to the inserted position causes the stopper projection 42c to come into contact with one of the rearward projections 45b of the rotational ring 45 as shown in FIG. 10, which prevents the filter frame 42 from further rotating in the filter insertion direction (clockwise direction with respect to FIG. 10). The aforementioned one of the rearward projections 45b, with which the stopper projection 42c comes into contact when the filter frame 42 is in the inserted position, is referred to as a stopper portion (an element of the insertion controller/contact portion) 45b-1. The stopper portion 45b-1 can be formed as a portion of the rotational ring 45 which is made not to come in contact with the support surface 100b of the base member 100, unlike the other rearward projections 45b, and to only prevent the filter frame 42 from rotating.

The protection sheet 48 is in the shape of a thin plate and supported by the rotational ring 45 and positioned between the filter frame 42 and each of the rotational ring 45 and the driving ring 46. The protection sheet 48 can prevent the filter frame 42 from getting stuck with the rotational ring 45 and the driving ring 46 in order to smooth the operation of the filter frame 42. The protection sheet 48 is in the shape of a letter C having a radially-exposed opening 48a that is exposed radially outwards (upwards with respect to FIG. 5) from an approximate center of the protection sheet 48 through which the optical axis O passes. A pair of positioning holes 48b are formed in the protection sheet 48 on opposite sides of the radially-exposed opening 48a, respectively, and the protection sheet 48 is fixedly supported by the rotational ring 45 with a pair of positioning projections 45d (see FIGS. 7 and 10), which are projected from the rotational ring 45, engaged in the pair of positioning holes 48b of the protection sheet 48. Three circumferentially-elongated holes 48c are formed in the protection sheet 48 at different positions in the circumferential direction thereof. The circumferentially-elongated holes 48c are each formed as a circular-arc-shaped elongated hole, the curvature center of which is on the optical axis O, and the rearward projections 46e of the driving ring 46 are inserted into the circumferentially-elongated holes 48c of the protection sheet 48, respectively. The circumferentially-elongated holes 48c are greater in circumferential length than the rearward projections 46e, respectively, to allow the driving ring 46 to rotate a predetermined amount of rotation relative to the protection sheet 48 and the rotational ring 45. A clearance hole 48d which prevents the first support shaft 42a and the second support shaft 42b from interfering with the protection sheet 48 is formed in the protection sheet 48 to be communicatively connected to one of the three circumferentially-elongated holes 48c (see FIGS. 5, 10 and 11). In addition, the protection sheet 48 is provided, at different positions overlaying the rearward projections 45b of the rotational ring 45, with a plurality of (four) cutouts 48e, respectively, so as not to interfere with the rearward projections 45b when supported on the rear of the rotational ring 45 thereby.

When the polarizing filter unit 40 is assembled, each component thereof is mounted to the motor support member 41 from the rear, and the base member 100 is lastly mounted to the rear of the motor support member 41. More specifically, the front end of the rotational guide portion 46b of the driving ring 46 is made to abut against the insertion limit surface 41d of the motor support member 41. This prevents the driving ring 46 from moving forward relative to the motor support member 41 and allows the driving ring 46 to be rotatably supported about the optical axis O along the rotational guide surface 41e. Subsequently, the combination of the annular friction member 44 and the rotational ring 45 is mounted onto the motor support member 41 with the friction sheet 47 held between the annular friction plate 44 and the abutting protrusion 41h of the motor support member 41. This prevents the annular friction member 44 and the rotational ring 45 from moving forward relative to the motor support member 41 and allows the annular friction member 44 and the rotational ring 45 to be rotatably supported about the optical axis O along the rotational guide surface 41f. It is desirable for the annular friction member 44 and the rotational ring 45 to be previously combined as an assembly with the resistance applying springs 49 inserted therebetween. In addition, the protection sheet 48 is attached to the back of the rotational ring 45, and the rearward projections 46e of the driving ring 46 are respectively inserted into the circumferentially-elongated holes 48c that are formed in the protection sheet 48. At this stage, the shaft bearing hole 45e of the rotational ring 45 and the rotation transmission hole 46d of the driving ring 46 are exposed rearwardly, and the filter frame 42 is installed with the first support shaft 42a and the second support shaft 42b respectively inserted into the shaft bearing hole 45e and the rotation transmission hole 46d. The polarizing filter 43 is fixed to the filter frame 42 beforehand.

Lastly, the front end of the outer surrounding wall 100c is fitted into the circumferential fitting portion 41g while the three lock projections 41c are engaged into the holes of the three lock lugs 100f, respectively, to fix the base member 100 to the rear of the motor support member 41. Each lock projection 41c has a beveled (inclined) surface which is inclined so as to increase the amount of radially outward projection thereof in the forward direction from the rear, and moving the base member 100 forwardly relative to the motor support member 41 causes the lock lugs 100f to ride across the beveled surfaces of the lock projections 41c while being elastically deformed, and further moving the base member 100 forwardly relative to the motor support member 41 causes the lock lugs 100f to be released from being deformed to thereby remain engaged with the lock projections 41c upon the aforementioned through-holes of the lock lugs 100f reaching positions corresponding to the lock projections 41c, respectively. In a state where the motor support member 41 and the base member 100 are thus combined, the support surface 100b of the base member 100 prevents each member mounted to the motor support member 41 therein from coming off rearwardly. Namely, each member installed between the motor support member 41 and the base member 100 remains held therebetween. In addition, the resistance applying springs 49 become compressed between the annular friction member 44 and the rotational ring 45, which causes the aforementioned frictional resistance to act on the annular friction member 44 and the rotational ring 45.

The polarizing filter unit 40 (including the shutter unit 81) assembled in the above described manner is fixed to the front of the second lens group moving ring 8 with the rear of the shutter unit 81 made to contact an insertion limit portion 8e, which is formed at the front end of the cylindrical portion 8a (see FIGS. 1, 2 and 4) of the second lens group moving ring 8. The second lens group moving ring 8 is provided with three lock lugs 8f which project forwardly from the cylindrical portion 8a, and the polarizing filter unit 40 is fixed to the second lens group moving ring 8 by making the lock lugs 8f engaged with the lock projections 100h, respectively. Each of the lock lugs 8f has a through-hole extending in a radial direction of the second lens group moving ring 8. Each lock projection 100h has a beveled (inclined) surface which is inclined so as to increase the amount of radially outward projection thereof in the forward direction from the rear, and moving the second lens group moving ring 8 forwardly relative to the polarizing filter unit 40 causes the lock lugs 8f to ride across the beveled surfaces of the lock projections 100h while being elastically deformed, and further moving the second lens group moving ring 8 forwardly relative to the polarizing filter unit 40 causes the lock lugs 8f to be released from being deformed to thereby remain engaged with the lock projections 100h upon the aforementioned through-holes of the lock lugs 8f reaching positions corresponding to the lock projections 100h, respectively.

As shown in FIG. 18, the camera incorporating the zoom lens barrel ZL is provided with a filter insertion switch 71, a filter removal switch 72 and a filter rotation switch 73 as controllers for the polarizing filter unit 40.

Operations of the polarizing filter unit 40 having the above described structure will be discussed hereinafter. As described above, the polarizing filter unit 40 holds annular members such as the annular friction plate 44, the rotational ring 45, the driving ring 46, the friction sheet 47 and the protection sheet 48 between the motor support member 41 and the base member 100, and the central opening 100a of the base member 100 is smaller in diameter than the openings of the annular friction plate 44, the rotational ring 45, the driving ring 46, the friction sheet 47 and the protection sheet 48 on the optical path (the optical axis O) (see FIGS. 11 through 14).

Namely, the minimum opening on the optical path in the polarizing filter unit 40 except the filter frame 42 and the polarizing filter 43 is defined by the central opening 100a of the base member 100. The polarizing filter 43 can be selectively switched between an inserted state in which the polarizing filter 43 is positioned in front of the central opening 100a, and a removed state in which the polarizing filter 43 is removed radially outwards from the central opening 100a. In addition, the polarizing filter 43 can be made to rotate about the optical axis O (rotate on the axis of the polarizing filter 43) when in the inserted state. The polarizing filter 43 is inserted into and removed from the optical path by rotation of the filter frame 42 between the inserted position and the fully removed position of the filter frame 42, and rotation of the polarizing filter 43 in the inserted state thereof is carried out by rotations of the rotational ring 45 and the driving ring 46.

FIGS. 6, 7, 15A, 16A and 17F show the removed state of the polarizing filter 43. In this state, the filter frame 42 is in the fully removed position, in which the filter frame 42 has entered inside the filter-accommodating wall 100d of the base member 100 so that the outer diameter side edge 42e is positioned alongside the inner wall surface of the filter-accommodating wall 100d, so that the filter frame 42 is prevented from further rotating in the filter removing direction (radially outward direction). In addition, the inner diameter side edge 42f of the filter frame 42 is positioned further radially-outward than the central opening 100a of the base member 100, so that the filter frame 42 does not interfere with rays of light passing through the central opening 100a. Additionally, the sensor pass-through projection 42g of the filter frame 42 has entered, through the sensor hole 100e, in between the light emitter and the light receiver of the photo interrupter that comprises the filter detection sensor 65. It is detected whether or not the filter frame 42 is in the fully removed position by an interruption of light to the light receiver of the photo interrupter by the sensor pass-through projection 42g.

The insertion operation of the polarizing filter 43 is performed by an operation of the filter insertion switch 71. When the polarizing filter 43 is inserted, the driving ring 46 is rotated by the filter drive motor 180 in a direction N1 shown in FIGS. 15A and 16A. N1 designates the rotational direction to insert the polarizing filter 43 into the optical path and on the optical axis O. Rotation of the driving ring 46 in the direction N1 causes a force in a rotational direction about the optical axis O to be transmitted from an inner side surface of the rotation transmission hole 46d of the driving ring 46 to the second support shaft 42b of the filter frame 42. At this stage, a frictional resistance acts on the rotational ring 45, which supports the first support shaft 42a of the filter frame 42 via the shaft bearing hole 45e, by the biasing force of the resistance applying springs 49, and the filter frame 42 which is pressed in the direction N1 by the driving ring 46 at the second support shaft 42b that is eccentric from the first support shaft 42a attempts to rotate about the axis of the first support shaft 42a (i.e., the axis of the shaft bearing hole 45e) in the direction toward the inserted position from the fully removed position. However, since the limit wall 100i of the base member 100 is positioned radially closer to the optical axis O than the sensor pass-through projection 42g of the filter frame 42 to face the sensor pass-through projection 42g inserted into the sensor hole 100e, the contact engagement between the sensor pass-through projection 42g and the limit wall 100i prevents the filter frame 42 from rotating toward the inserted position. Thereupon, the rotational driving force in the direction N1 which is transmitted from the filter frame 42 to the rotational ring 45 via the engagement between the first support shaft 42a and the shaft bearing hole 45e exceeds the aforementioned frictional resistance that acts on the rotational ring 45 by the biasing force of the resistance applying springs 49, which causes the rotational ring 45 (a combination of the annular friction plate 44, the rotational ring 45 and the protection sheet 48) to rotate with the driving ring 46 in the direction N1. The filter frame 42 also rotates following this rotation of the rotational ring 45, which causes the sensor pass-through projection 42g to come out of the sensor hole 100e.

Figure 16A:
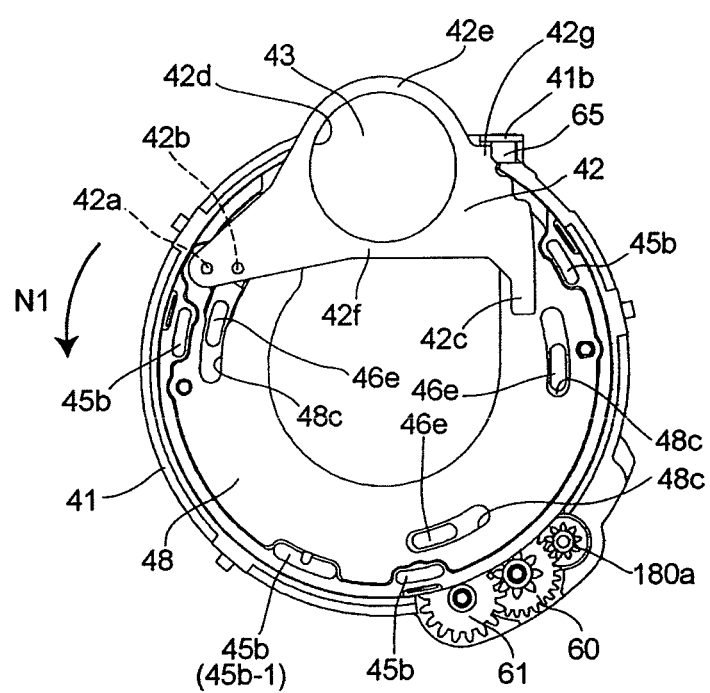
FIGS. 16A, 16B, 16C, 16D and 16E are rear elevational views of the polarizing filter unit, showing a series of operations moving the polarizing filter from the polarizing filter removed state to the polarizing filter inserted state, and subsequently rotating the polarizing filter about the optical axis, in that order from FIG. 16A through FIG. 16E.
Figure 16B:
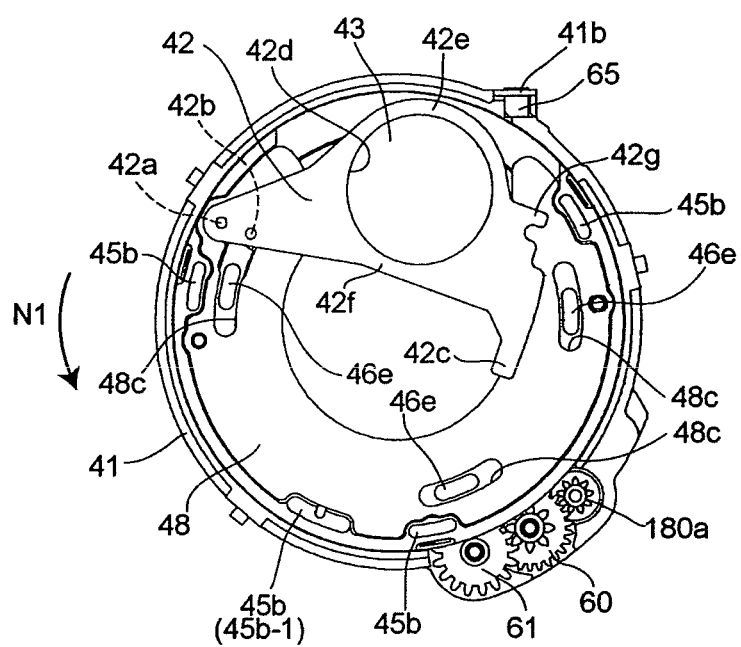
Figure 16C:
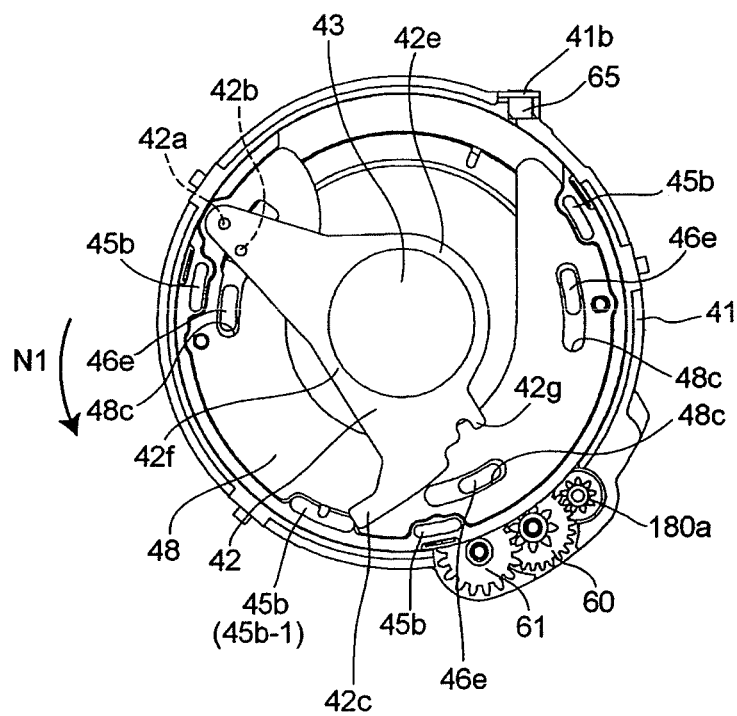
Figure 16D:
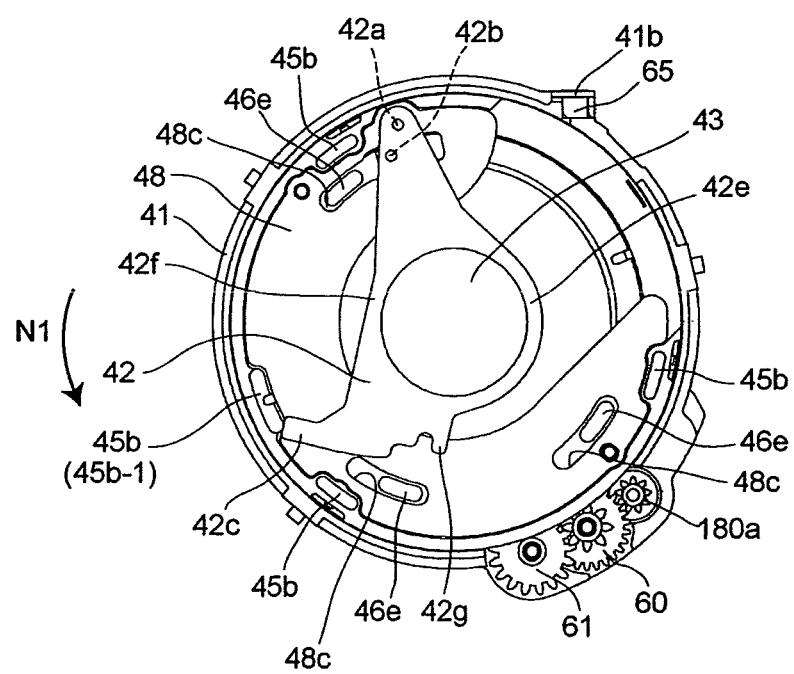
Figure 16E:
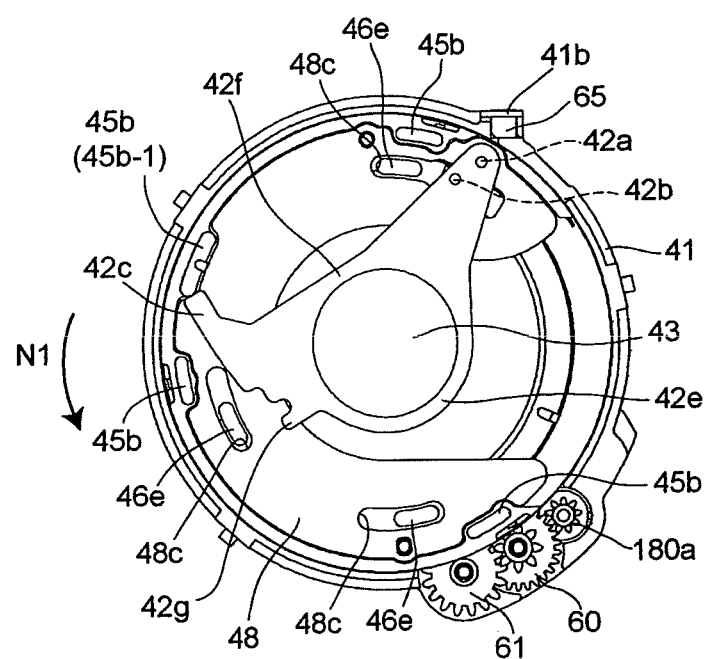

This releases the engagement between the sensor pass-through projection 42g and the limit wall 100i, thereby enabling the filter frame 42 to rotate toward the inserted position. In a state where the rotation of the filter frame 42 is not restricted in the insertion/removal direction, the magnitude of the biasing force of the resistance applying springs 49 is predetermined to exert a frictional resistance on the annular friction plate 44 and the rotational ring 45 to a degree in order to allow only the filter frame 42 to rotate in the filter insertion/removal direction while preventing the rotational ring 45 from rotating. Therefore, upon the sensor pass-through projection 42g coming out of the sensor hole 100e, the rotational ring 45 does not rotate while following rotation of the driving ring 46 and remains stationary, and the filter frame 42 the second support shaft 42b of which is pressed in the direction N1 by the driving ring 46 commences to rotate about the axis of the first support shaft 42a (i.e., the axis of the shaft bearing hole 45e) in the direction toward the inserted position from the fully removed position (see FIG. 16B). During this rotation of the driving ring 46 relative to the rotational ring 45, the rearward projections 46e circumferentially move in the circumferentially-elongated holes 48c, respectively, so that the protection sheet 48 does not interfere with the rotation of the driving ring 46.

Upon the filter frame 42 reaching the inserted position that is shown in FIGS. 9, 10, 15B and 16C, the stopper projection 42c comes into contact with the stopper portion 45b-1 of the rotational ring 45 (which is one of the rearward projections 45b). At this time, the center of the filter opening 42d of the filter frame 42 coincides with the optical axis O, while the polarizing filter 43 comes into the inserted state, in which the polarizing filter 43 is positioned in the optical path in front of the central opening 100a. The contact engagement of the stopper projection 42c with the stopper portion 45b-1 prevents the filter frame 42 from further rotating in the filter insertion direction (clockwise direction with respect to FIG. 10) relative to the rotational ring 45.

In a state where the filter frame 42 is in the inserted position, the polarizing filter 43 can be made to rotate about the optical axis O in accordance with the operation of the filter rotation switch 73. When the polarizing filter 43 is rotated about the optical axis O, the driving ring 46 is rotated in the direction N1 by the filter drive motor 180. Thereupon, a rotational force in the direction N1 is transmitted to the filter frame 42 due to the engagement between the rotation transmission hole 46d of the driving ring 46 and the second support shaft 42b. At this point, the filter frame 42 is prevented from rotating in the direction toward the inserted position relative to the rotational ring 45 by the engagement between the stopper projection 42c and the stopper portion 45b-1; accordingly, the rotational driving force in the direction N1 which is transmitted from the filter frame 42 to the rotational ring 45 via the engagement between the first support shaft 42a and the shaft bearing hole 45e exceeds the aforementioned frictional resistance that acts on the rotational ring 45 by the biasing force of the resistance applying springs 49, which causes the rotational ring 45 (a combination of the annular friction plate 44, the rotational ring 45 and the protection sheet 48) to rotate with the driving ring 46 in the direction N1 (see FIGS. 15C through 15F, and 16D through 16E). In a state where the rotational ring 45 rotates while following rotation of the driving ring 46, the relative position between the shaft bearing hole 45e and the rotation transmission hole 46d, in which the first support shaft 42a and the second support shaft 42b are respectively inserted, does not vary, and accordingly, the filter frame 42 rotates about the optical axis O together with the rotational ring 45 and the driving ring 46 while keeping itself in the inserted position, in which the polarizing filter 43 lies on the optical path. Namely, the polarizing filter 43 is rotated about the optical axis O. The polarizing filter 43 stops rotating immediately after the filter drive motor 180 is stopped.

The removal operation of the polarizing filter 43 is performed by an operation of the filter removal switch 72. At the removal of the polarizing filter 43, the driving ring 46 is rotated by the filter drive motor 180 in a direction N2 shown in FIG. 17A. N2 designates the rotational direction to remove the polarizing filter 43 from the optical path on the optical axis O. Transmission of a rotational force of the driving ring 46 in the direction N2 to the filter frame 42 via the rotation transmission hole 46d and the second support shaft 42b causes the filter frame 42 to rotate about the axis of the first support shaft 42a (i.e., the axis of the shaft bearing hole 45e) relative to the rotational ring 45 in a direction to move the stopper projection 42c away from the stopper portion 45b-1, i.e., in the direction toward the removed position from the inserted position. At this stage, a frictional resistance acts on the rotational ring 45 by the biasing force of the resistance applying springs 49, so that the rotational ring 45 does not rotate while following the rotation of the driving ring 46 and keeps itself stationary.

Rotation of the filter frame 42 in the direction toward the removed position causes the outer diameter side edge 42e of the filter frame 42 to come into contact with the inner wall surface of the outer surrounding wall 100c of the base member 100 as shown in FIG. 17B, thus causing the filter frame 42 to stop at the aforementioned limited removed position, at which the amount of removal of the filter frame 42 from the inserted position is smaller than that when the filter frame 42 stops at the fully removed position. In this state, if the driving ring 46 is further rotated in the direction N2, the rotational driving force in the direction N2 which is transmitted from the filter frame 42 to the rotational ring 45 via the engagement between the first support shaft 42a and the shaft bearing hole 45e exceeds the aforementioned frictional resistance that acts on the rotational ring 45 by the biasing force of the resistance applying springs 49, which causes the rotational ring 45 (a combination of the annular friction plate 44, the rotational ring 45 and the protection sheet 48) to rotate with the driving ring 46 in the direction N2. This rotation of the rotational ring 45 following the rotation of the driving ring 46 in the direction N2 causes the filter frame 42 to rotate about the optical axis O in the direction N2 while making the outer diameter side edge 42e slide on the outer surrounding wall 100c as shown in FIGS. 17C and 17D.

Figure 17A:
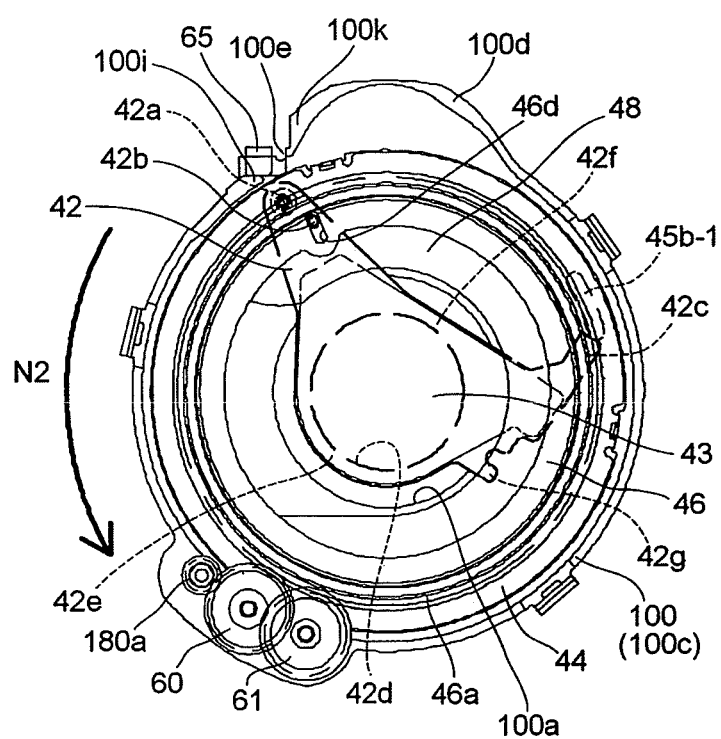
FIGS. 17A, 17B, 17C, 17D, 17E and 17F are front elevational views of the polarizing filter unit, showing a series of operations moving the polarizing filter from the polarizing filter inserted state to the polarizing filter removed state, in that order from FIG. 17A through FIG. 17F.
Figure 17B:
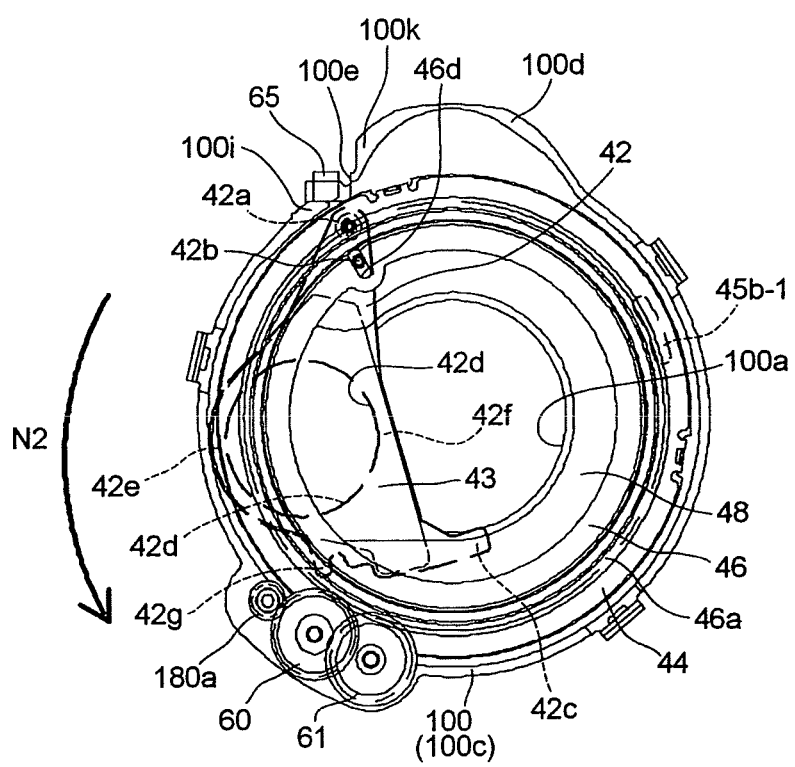
Figure 17C:
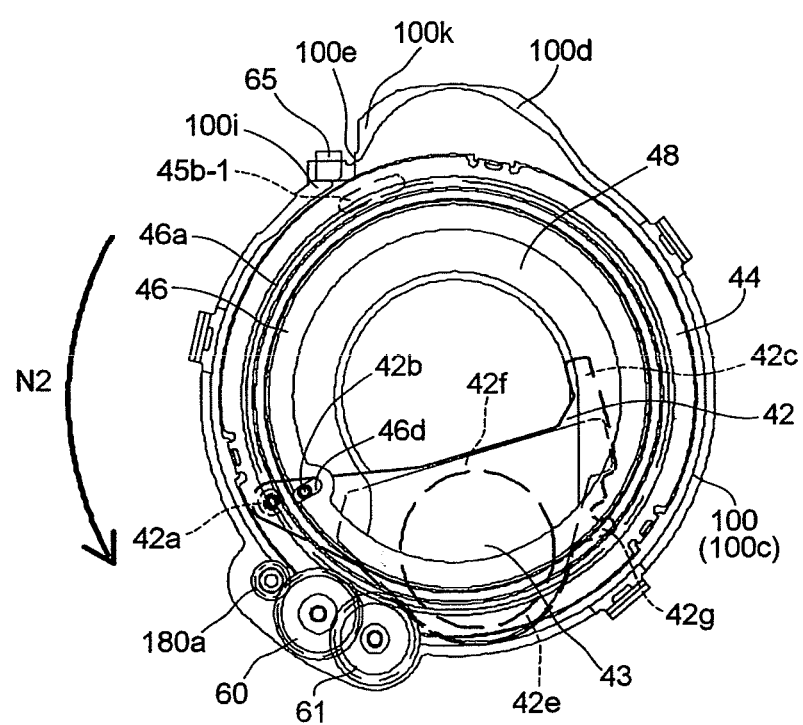
Figure 17D:
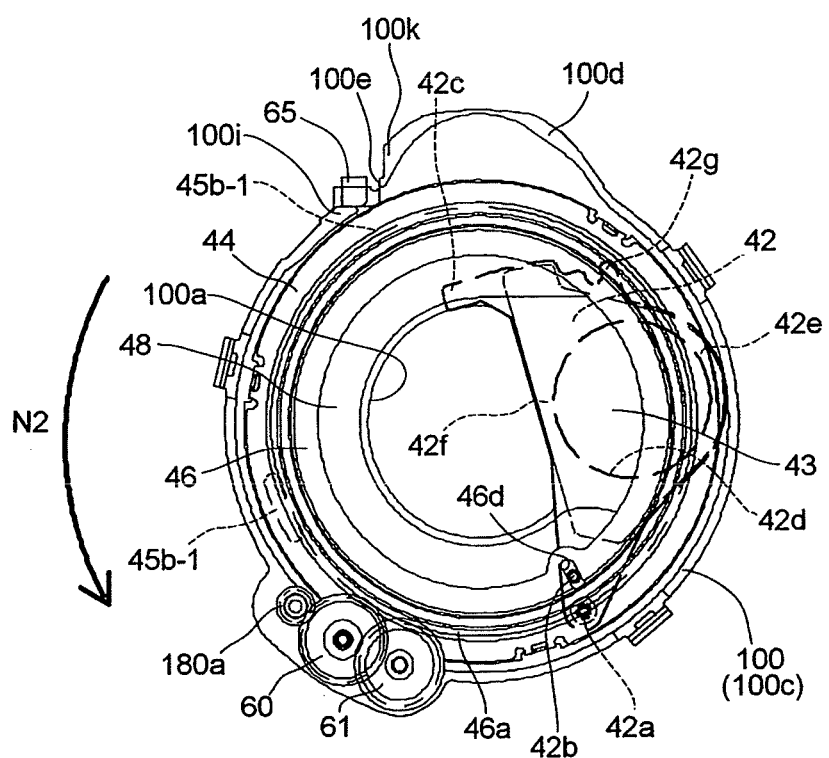
Figure 17E:
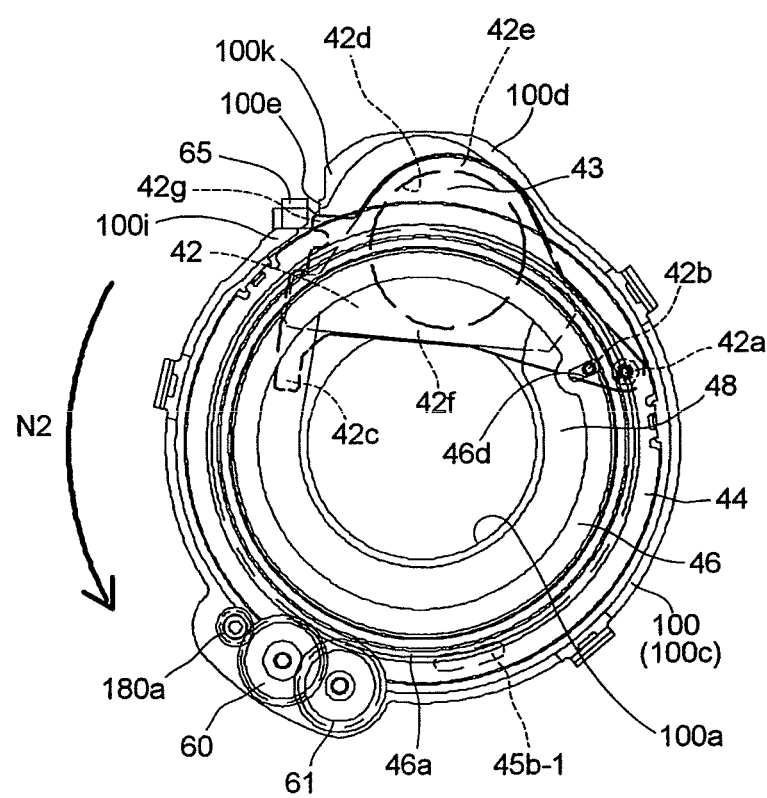

When the filter frame 42 is rotated in the direction N2 to a position beyond the boundary between the filter-accommodating wall 100d and the outer surrounding wall 100c of the base member 100, the filter frame 42 is released from being held by the outer surrounding wall 100c at the limited removed position, is rotated toward the fully removed position to a position where the outer diameter side edge 42e contacts the inner wall surface of the filter-accommodating wall 100d as shown in FIG. 17E, and subsequently continues to be rotated in the direction N2 while making the outer diameter side edge 42e slide on the inner wall surface of the filter-accommodating wall 100d. Since the inner wall surface of the outer surrounding wall 100c is a cylindrical surface with its center on the optical axis O, the rotational ring 45 and the driving ring 46 integrally rotate in the state shown in FIGS. 17C to 17D, in which the outer diameter side edge 42e of the filter frame 42 slides on the outer surrounding wall 100c. On the other hand, since the inner wall surface of the filter-accommodating wall 100d is a curved surface which is greater in curvature (i.e., has a smaller radius of curvature) than the inner wall surface of the outer surrounding wall 100c, the filter frame 42 when the outer diameter side edge 42e is moved along the inner wall surface of the filter-accommodating wall 100d not only rotates (following rotation of the driving ring 46) about the optical axis O in the direction N2 but also rotates (relative to the rotational ring 45) about the axis of the first support shaft 42a (i.e., the axis of the shaft bearing hole 45e). During this rotation of the filter frame 42 relative to the rotational ring 45, a difference in amount of rotation per unit of time occurs between the driving ring 46 which continues to rotate in the direction N2 and the rotational ring 45 which is about to stop rotating due to the frictional resistance created by the biasing force of the resistance applying springs 49, which makes the driving ring 46 greater in amount of rotation than the rotational ring 45. This makes the filter frame 42 rotate to the fully removed position so that the outer diameter side edge 42e and the filter-accommodating wall 100d are substantially aligned both in a radial direction from the optical axis O and in the optical axis direction. Accordingly, the inner wall surface of the filter-accommodating wall 100d functions as a guide surface which guides the filter frame 42 from the limited removed position to the fully removed position. In addition, at the final stage of the removal operation of the filter frame 42, the sensor pass-through projection 42g enters in between the light emitter and the light receiver of the filter detection sensor 65 through the sensor hole 100e, so that the filter detection sensor 65 detects that the filter frame 42 has reached the fully removed position. In response to this detection by the filter detection sensor 65, the film drive motor 180 is stopped, which completes the removal operation of the polarizing filter 43 (see FIG. 17F). In other words, the filter frame 42 securely reaches the fully removed position by a combination of the rotation of the filter frame 42 about the optical axis O (in the direction N2) when the filter frame 42 is guided by the inner wall surface of the filter-accommodating wall 100d and the rotation of the filter frame 42 about the first support shaft 42a, and the filter frame 42 brings the sensor pass-through projection 42g thereof to the position to be detected by the filter detection sensor 65.

In the case where the filter frame 42 commences to perform the removal operation from a specific position in the rotational direction of the filter frame 42 about the optical axis O, the outer diameter side edge 42e comes into contact with the inner wall surface of the filter-accommodating wall 100d from the beginning as shown in FIG. 17E without passing through the step at which the outer diameter side edge 42e comes into contact with the outer surrounding wall 100c. In this case also, the operation of the filter frame 42 at the final stage of the removal operation thereof is the same as described above; namely, the filter frame 42 rotates in the direction N2 while rotating about the first support shaft 42a and brings the sensor pass-through projection 42g into the sensor hole 100e to reach the fully removed position.

Figure 19:
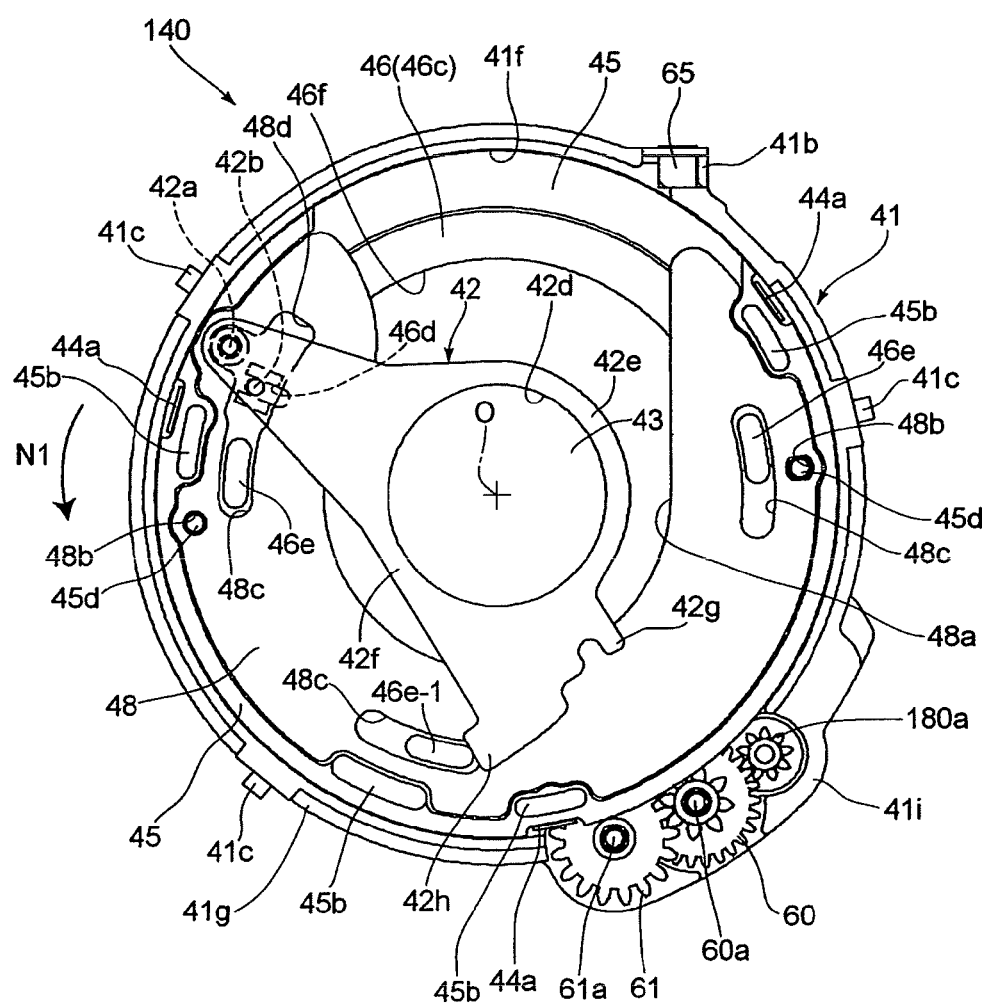
FIG. 19 is a rear elevational view of another embodiment of the polarizing filter unit, with the base member omitted, viewed from the rear in the optical axis direction, wherein an insertion controller for a filter frame in this embodiment of the polarizing filter unit is different from that in the embodiment of the polarizing filter unit shown in FIG. 5.
Figure 20:
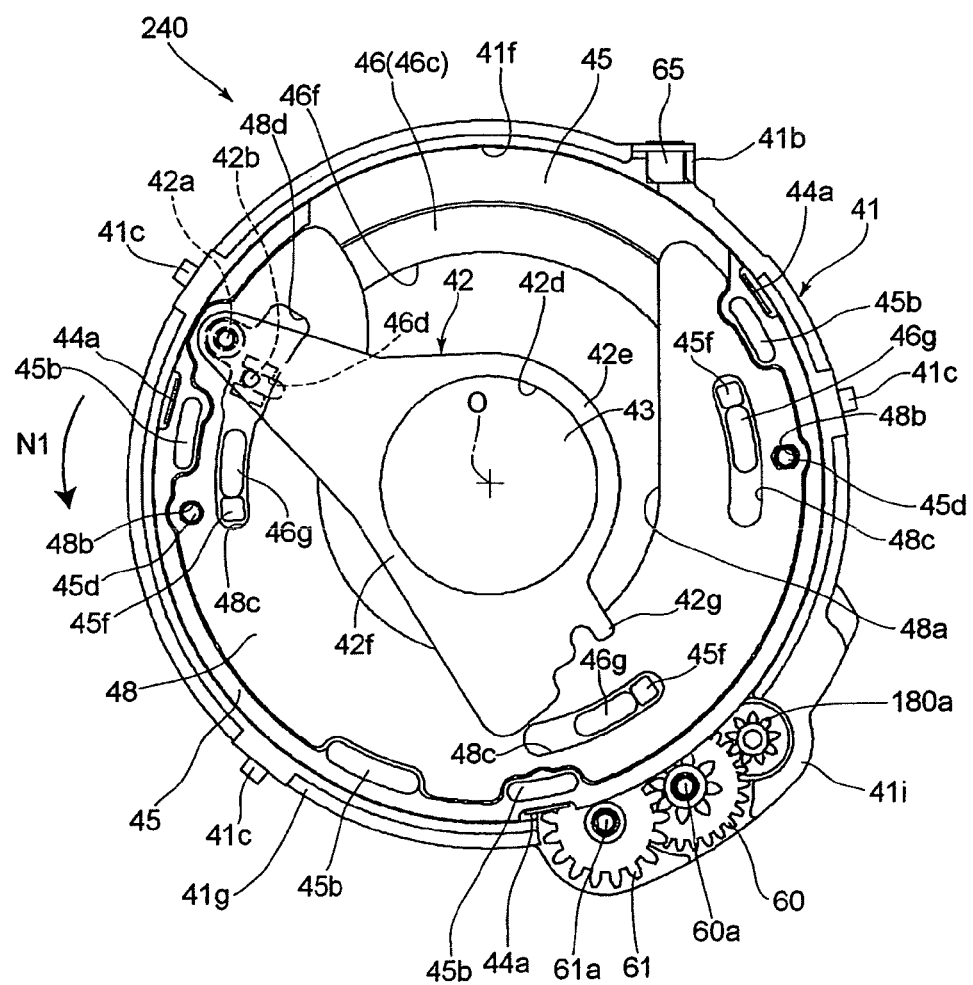
FIG. 20 is a rear elevational view of yet another embodiment of the polarizing filter unit, with the base member omitted, viewed from the rear in the optical axis direction, wherein the insertion controller for the filter frame in this embodiment of the polarizing filter unit is different from those in the embodiments of the polarizing filter units shown in FIGS. 5 and 19.
Figure 21:
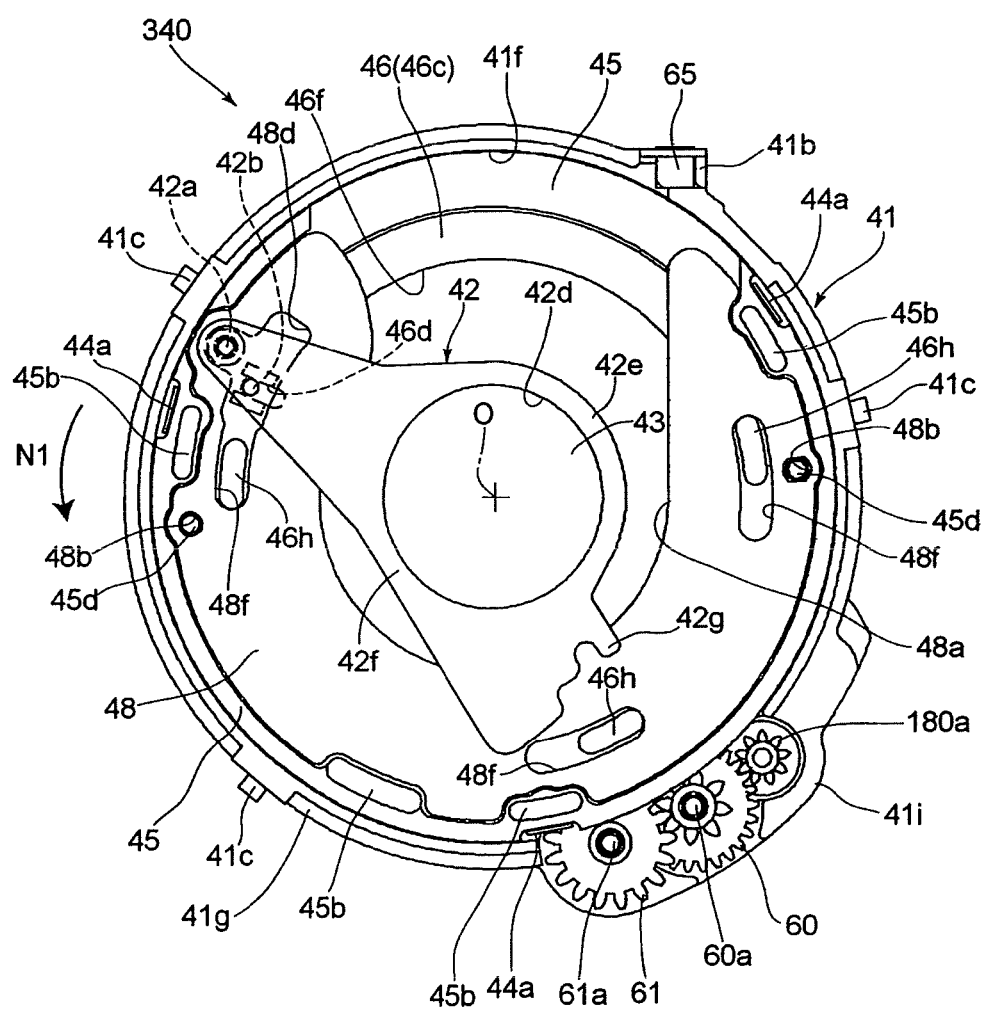
FIG. 21 is a rear elevational view of yet another embodiment of the polarizing filter unit, with the base member omitted, viewed from the rear in the optical axis direction, wherein the insertion controller for the filter frame in this embodiment of the polarizing filter unit is different from those in the embodiments of the polarizing filter units shown in FIGS. 5, 19 and 20.

In the polarizing filter unit 40 for the above described embodiment of the retractable zoom lens barrel ZL, when the driving ring 46 is rotated in the direction N1, the rotational ring 45 does not rotate and stands still by the biasing force of the resistance applying springs 49 until the stopper projection 42c comes into contact with the stopper portion 45b-1, and subsequently, the rotational ring 45 rotates following the rotation of the driving ring 46 after the stopper projection 42c comes into contact with the stopper portion 45b-1. Accordingly, when the driving ring 46 rotates in the filter insertion direction (i.e., the direction N1), the stopper projection 42c of the filter frame 42 and the stopper portion 45b-1 of the rotational ring 45 are used as an insertion controller for switching between a relatively rotating state of the rotational ring 45 and the driving ring 46, and an integrally rotating state thereof. FIGS. 19 through 21 show other embodiments of the polarizing filter units that are equipped with an insertion controller different from that in the previous embodiment of the polarizing filter unit 40.

In a polarizing filter unit 140 shown in FIG. 19, the filter frame 42 is provided with a stopper projection (an element of an insertion controller/contact portion) 42h instead of the stopper projection 42c. The stopper projection 42h is smaller in amount of radially inward projection than the stopper projection 42c. Upon the filter frame 42 being rotated from the fully removed position to the inserted position, following rotation of the driving ring 46 in the direction N1 as shown in FIG. 19, the stopper projection 42h comes into contact with one of the three rearward projections 46e of the driving ring 46, i.e., a stopper portion (an element of the insertion controller/contact portion) 46e-1 of the driving ring 46, which prevents the filter frame 42 from further rotating in the filter insertion direction (clockwise direction with respect to FIG. 19) relative to the driving ring 46. Thereupon, the filter frame 42 commences to rotate with the driving ring 46 in the direction N1, and the rotational ring 45 also rotates in the direction N1 following the rotation of the driving ring 46 due to the engagement between the first support shaft 42a and the shaft bearing hole 45e.

In a polarizing filter unit 240 shown in FIG. 20, the rotational ring 45 is provided on the rear thereof with three stopper protrusions (elements of an insertion controller/contact portions) 45f with which three rearward projections (insertion controller contact portion) 46g which project rearward from the rear of the driving ring 46 come into contact, respectively, when the driving ring 46 is rotated in the direction N1. Upon the filter frame 42 being rotated to the inserted position following rotation of the driving ring 46 in the direction N1, the rearward projections 46g come into contact with the stopper protrusions 45f, respectively, as shown in FIG. 20. Thereupon; rotation of the driving ring 46 in the direction N1 is transmitted to the rotational ring 45, thus causing the rotational ring 45 to rotate in the direction N1 together with the driving ring 46. Although the three stopper protrusions 45f are formed on the rotational ring 45 to correspond to the three rearward projections 46g of the driving ring 46 in the embodiment shown in FIG. 20, it is possible to make the rotational ring 45 rotate following rotation of the driving ring 46 only if at least one stopper protrusion 45f and corresponding at least one rearward projection 46g are formed on the rotational ring 45 and the driving ring 46, respectively; therefore, each of the number of stopper protrusions 45f and the number of rearward projections 46g is not limited to three.

In a polarizing filter unit 340 shown in FIG. 21, three circumferentially-elongated holes (elements of an insertion controller/contact portions) 48f, which are smaller in circumferential length than the three circumferentially-elongated holes 48c of the previous embodiments of the polarizing filter units 40, 140 and 240, are provided. Upon the filter frame 42 being rotated to the inserted position following rotation of the driving ring 46 in the direction N1, three rearward projections (elements of the insertion controller/contact portions) 46h formed on the rear of the driving ring 46 come into contact with one end of each respective circumferentially-elongated hole 48f, as shown in FIG. 21. Thereupon, rotation of the driving ring 46 in the direction N1 is transmitted to the protection sheet 48, thus causing the rotational ring 45 that supports the protection sheet 48 to rotate in the direction N1 together with the driving ring 46. Although the polarizing filter unit 340 is structured such that the three rearward projections 46h come into contact with one end of each respective circumferentially-elongated hole 48f simultaneously, in the embodiment shown in FIG. 21, it is possible to make the rotational ring 45 rotate following rotation of the driving ring 46 only if at least one rearward projection 46h and corresponding at least one circumferentially-elongated hole 48f are respectively formed on the driving ring 46 and the protection sheet 48 as contact portions which come into contact with each other. For instance, it is possible for two of the three circumferentially-elongated holes that are formed in the protection sheet 48 to be each formed as a circumferentially-elongated hole having a long circumferential length such as each circumferentially-elongated hole 48c (see FIGS. 7 and 10) while the other circumferentially-elongated hole is formed as a circumferentially-elongated hole having a short circumferential length such as each circumferentially-elongated hole 48f (see FIG. 21) so as to allow one rearward projection 46h to come into contact with only one end of the aforementioned other circumferentially-elongated hole that has a short circumferential length. Alternatively, the plurality of rearward projections 46h that are formed on the driving ring 46 on the rear side (the rotational ring 45 side) thereof can be formed to have different lengths so that one or more of the rearward projections 46h are contactable with the protection sheet 48 and the remaining rearward projections 46h do not contact the sheet 48.

Additionally, in the above described polarizing filter unit 40, the position of the filter frame 42 is controlled by the sliding contact of the outer diameter side edge 42e of the filter frame 42 with the outer surrounding wall 100c of the base member 100 or the inner wall surface of the filter-accommodating wall 100d at the limited removed position (that is located radially more inward than the fully removed position) when the filter frame 42 is rotated from the inserted position to the fully removed position. In contrast to this, FIGS. 22 through 27 show other embodiments of the polarizing filter units that are equipped with a removal controller different from that in the previous embodiment of the polarizing filter unit 40.

Figure 22:
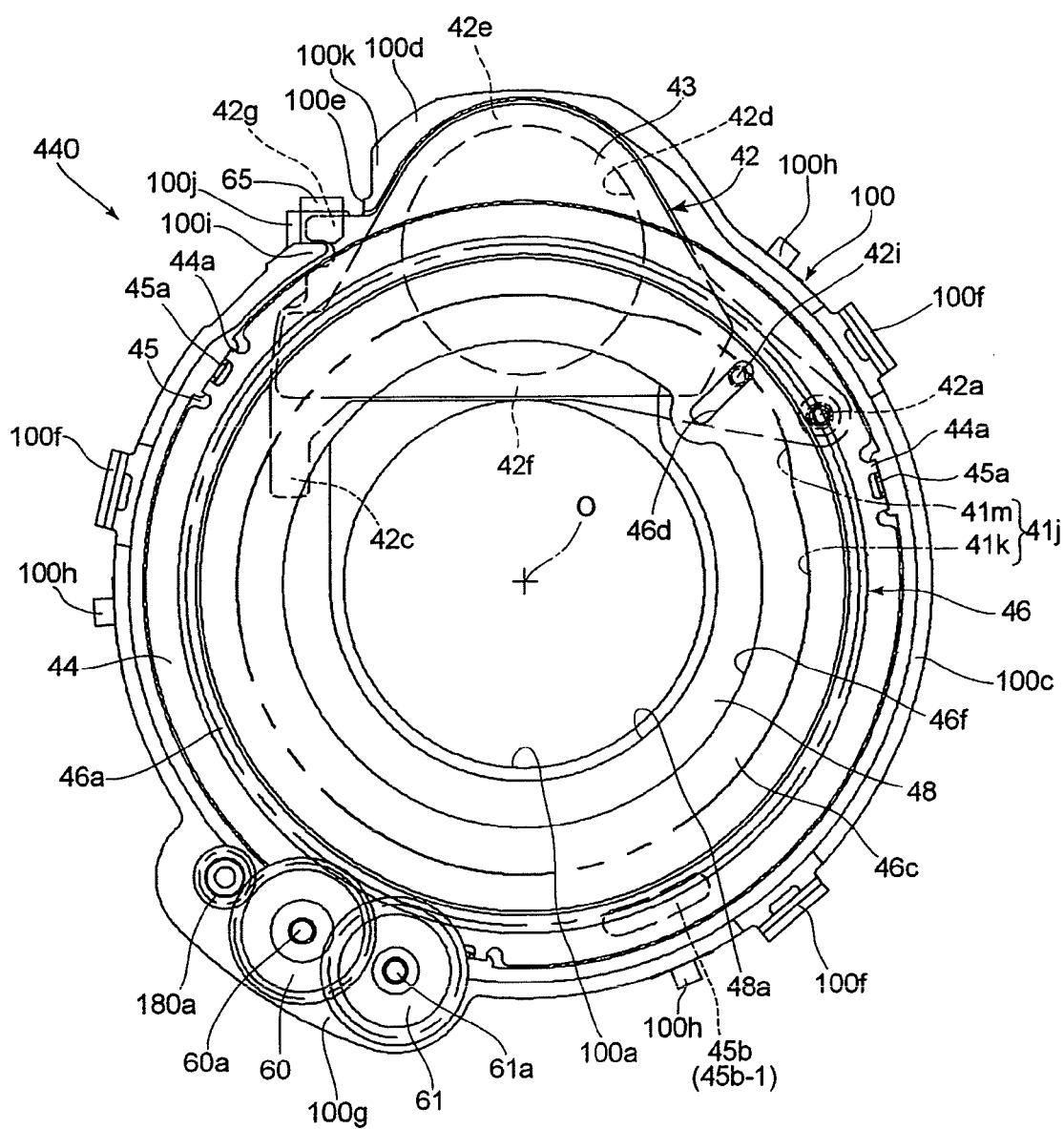
FIG. 22 is a front elevational view of another embodiment of the polarizing filter unit in the polarizing filter removed state, with the motor support member omitted, viewed from the front in the optical axis direction, wherein a removal controller for the filter frame in this embodiment of the polarizing filter unit is different from that in the embodiment of the polarizing filter unit shown in FIG. 5.
Figure 23:
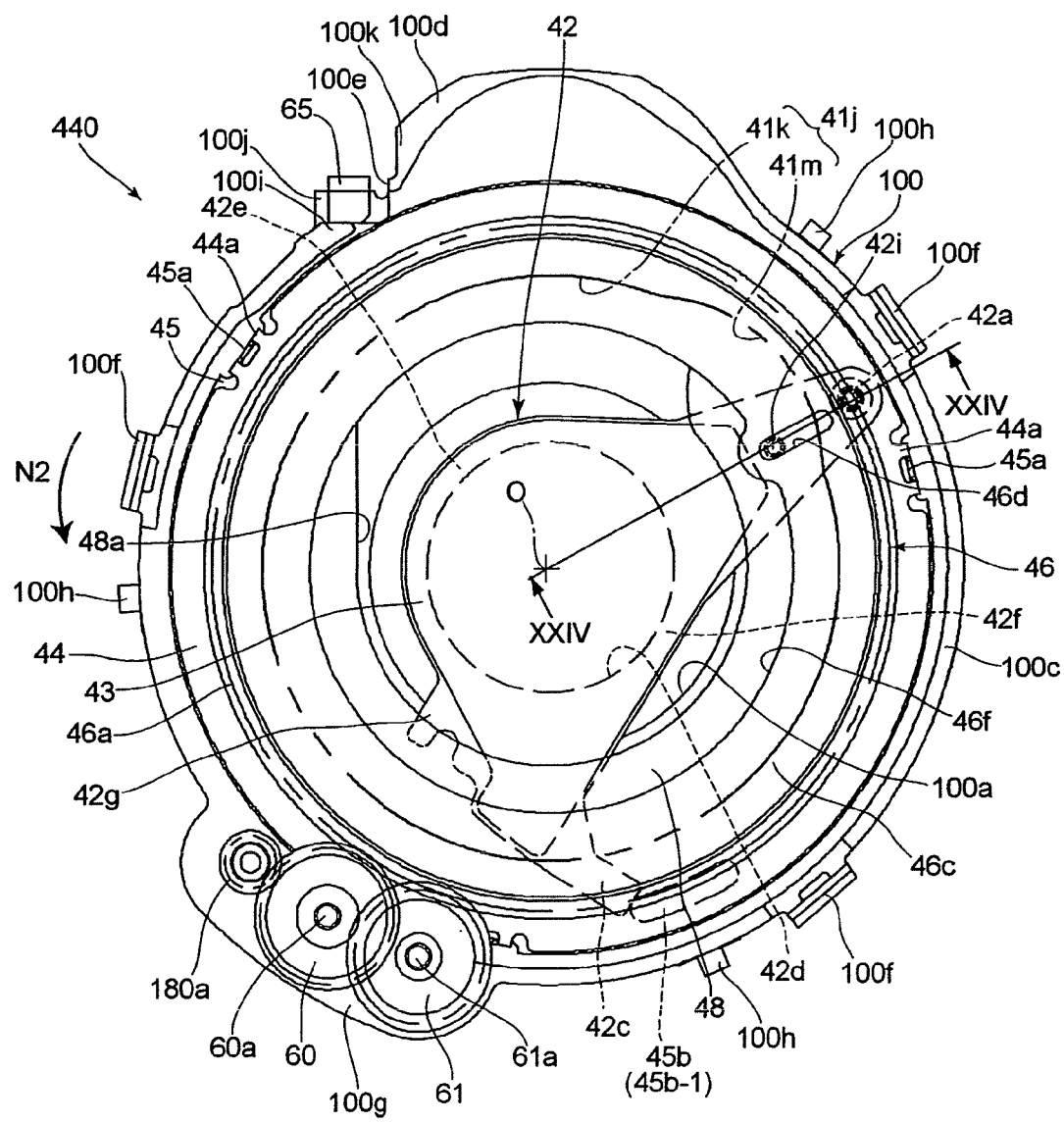
FIG. 23 is a front elevational view of the polarizing filter unit shown in FIG. 22 in the polarizing filter inserted state, viewed from the front in the optical axis direction.
Figure 24:
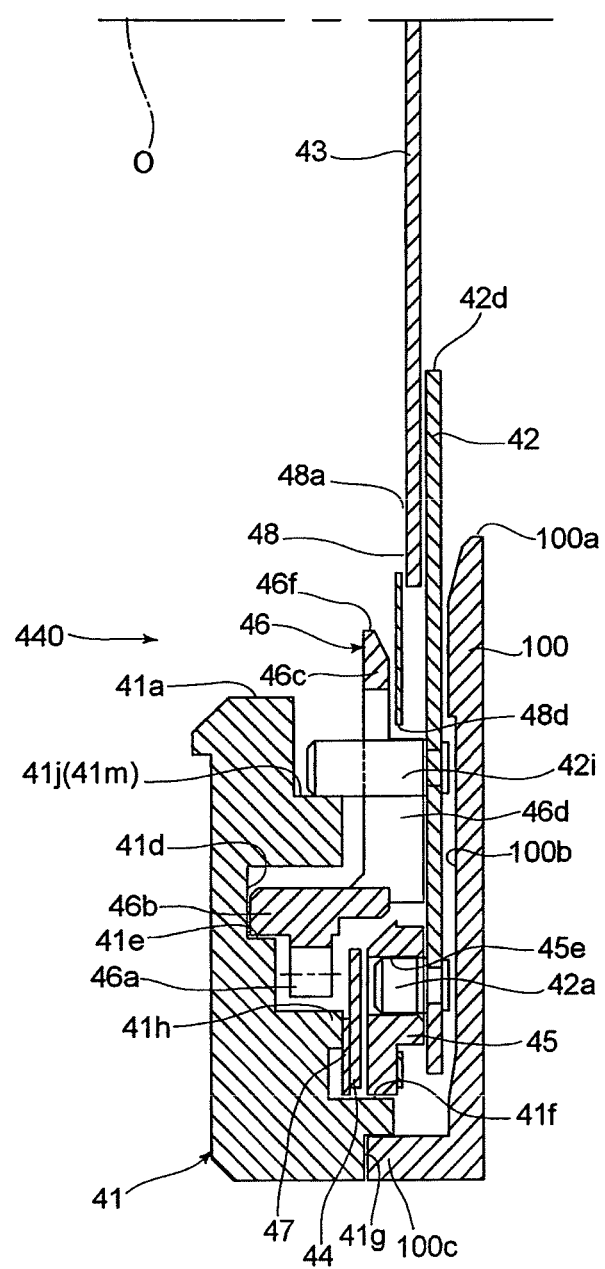
FIG. 24 is a cross sectional view taken along the line XXIV-XXIV shown in FIG. 23.
Figure 25:
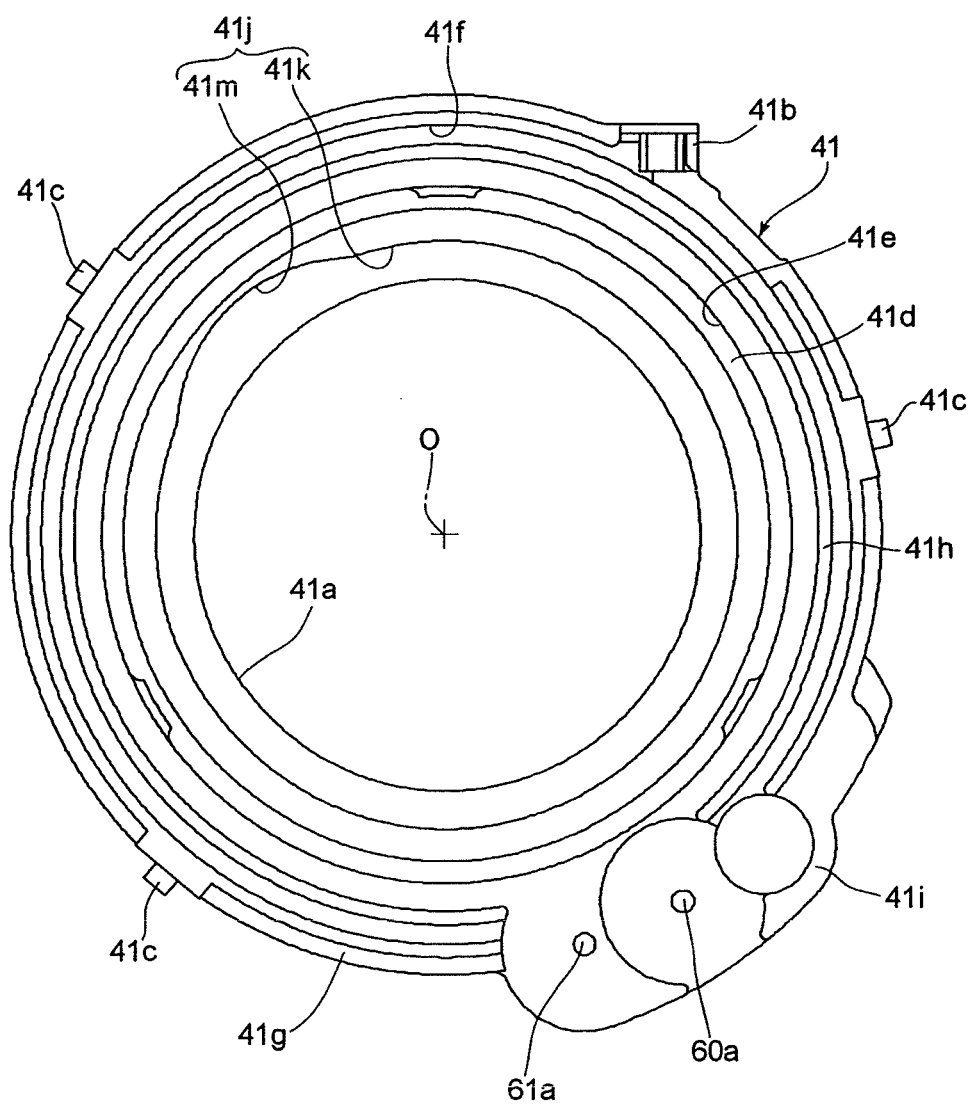
FIG. 25 is a rear elevational view of the motor support member shown in FIG. 24, viewed from the rear in the optical axis direction.

In a polarizing filter unit 440 shown in FIGS. 22 through 24, the motor support member 41 that constitutes, together with the base member 100, a support member for the polarizing filter unit 440 is provided with a filter control cam (an element of a removal controller) 41j, as shown in FIG. 25. As shown in FIGS. 24 and 25, the filter control cam 41j is formed as a circumferential cam which is positioned in front of the central opening 100a and which faces radially inwards. The filter control cam 41j is provided with a constant-radius cam portion (an element of the removal controller/cylindrical wall portion) 41k and a circular-arc-shaped accommodating cam portion (an element of the removal controller/accommodating wall portion) 41m. The constant-radius cam portion 41k has a constant radius (curvature) about the optical axis O, and the accommodating cam portion 41m bulges radially outwards from the constant-radius cam portion 41k and is greater in curvature than the constant-radius cam portion 41k.

The filter frame 42 of the polarizing filter unit 440 is provided in the vicinity of the first support shaft 42a with a second support shaft (rotation transmission portion/removal controller/removal limit portion/projection) 42i which corresponds to the second support shaft 42b of the previous embodiments. The second support shaft 42i is formed longer in the optical axis direction than the second support shaft 42b of the previous embodiments; specifically, the second support shaft 42i is extended forward to a position where it is capable of contacting the filter control cam 41j through the rotation transmission hole 46d of the driving ring 46 as shown in FIG. 24. The rotation transmission hole 46d is elongated radially outwards to a position allowing the second support shaft 42i to come into contact with the filter control cam 41j. Therefore, the filter frame 42 makes the second support shaft 42i move radially outwards and inwards to be engaged with and disengaged from the filter control cam 41j by rotating about the first support shaft 42a. As shown in FIG. 23, the second support shaft 42i is spaced from the filter control cam 41j when the filter frame 42 is in the inserted position. When the driving ring 46 is rotated in the direction N2 shown in FIG. 23, the filter frame 42 is rotated in the direction toward the removed position from the inserted position. Subsequently, the second support shaft 42i comes into contact with the filter control cam 41j upon the filter frame 42 rotating about the first support shaft 42a by a predetermined amount of rotation. At this time, whether the second support shaft 42i comes into contact with the constant-radius cam portion 41k or the accommodating cam portion 41m of the filter control cam 41j depends on the position of the driving ring 46 in the rotational direction thereof at the commencement of the rotation of the filter frame 42 in the direction toward the removed position. In the case where the second support shaft 42i comes into contact with the constant-radius cam portion 41k, the filter frame 42 is held at the limited removed position that is located radially more inward than the fully removed position, and the filter frame 42 and the rotational ring 45 are rotated in the direction N2 together with the driving ring 46 while making the second support shaft 42i slide on the constant-radius cam portion 41k. Soon thereafter, the second support shaft 42i reaches a position on the accommodating cam portion 41m from the constant-radius cam portion 41k; and thereupon, the filter frame 42 rotates about the first support shaft 42a while rotating in the direction N2 with the second support shaft 42i sliding on the accommodating cam portion 41m, and is guided to the fully removed position shown in FIG. 22 by the accommodating cam portion 41m. In the case where the second support shaft 42i comes into contact with the accommodating cam portion 41m from the beginning, the step of making the second support shaft 42i slide on the constant-radius cam portion 41k (the step of holding the filter frame 42 at the limited removed position) is omitted from the above described operations, and the filter frame 42 is moved to the fully removed position shown in FIG. 22 while being guided by the accommodating cam portion 41m.

Figure 26:
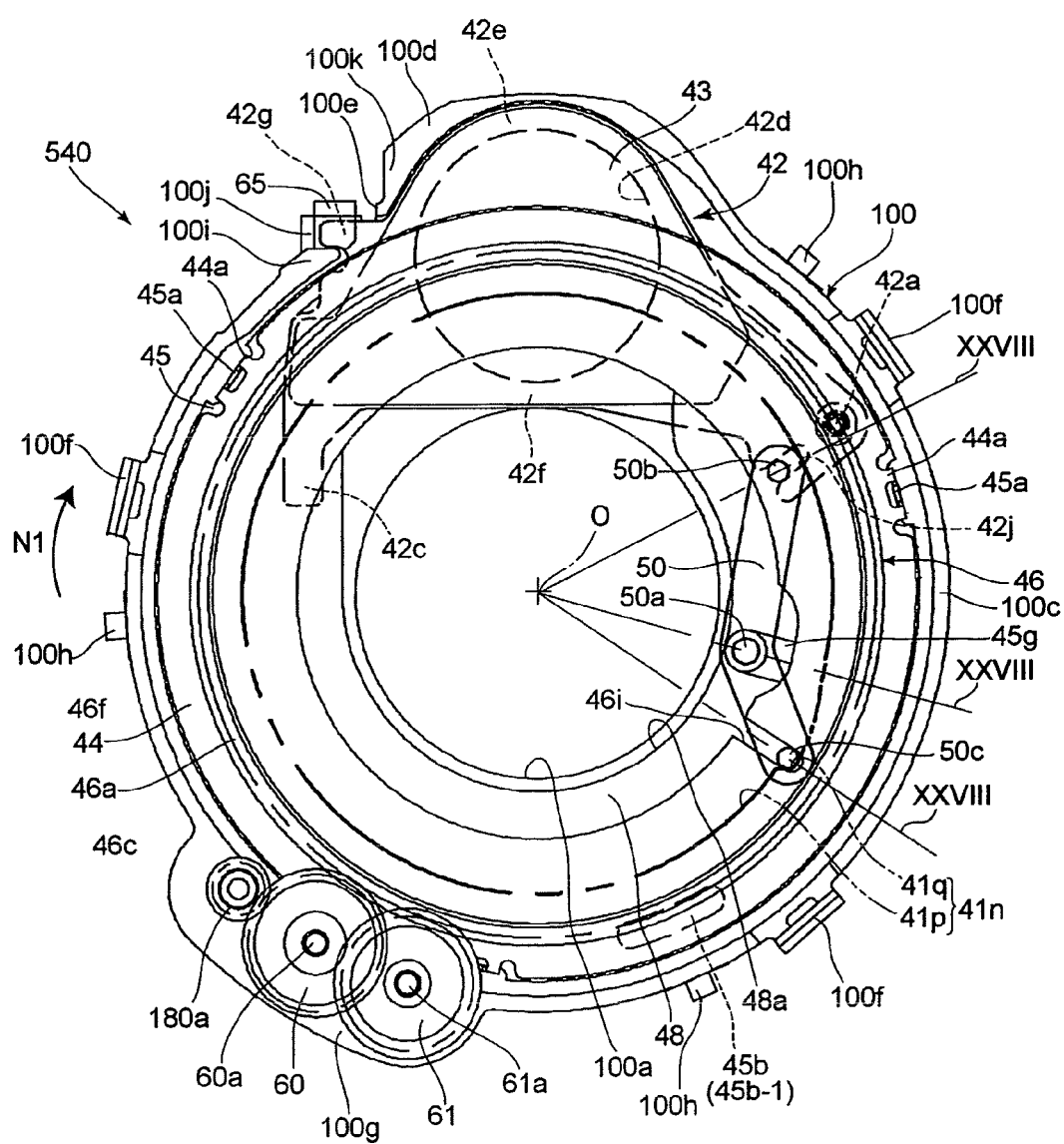
FIG. 26 is a front elevational view of yet another embodiment of the polarizing filter unit in the polarizing filter removed state, with the motor support member omitted, viewed from the front in the optical axis direction.
Figure 27:
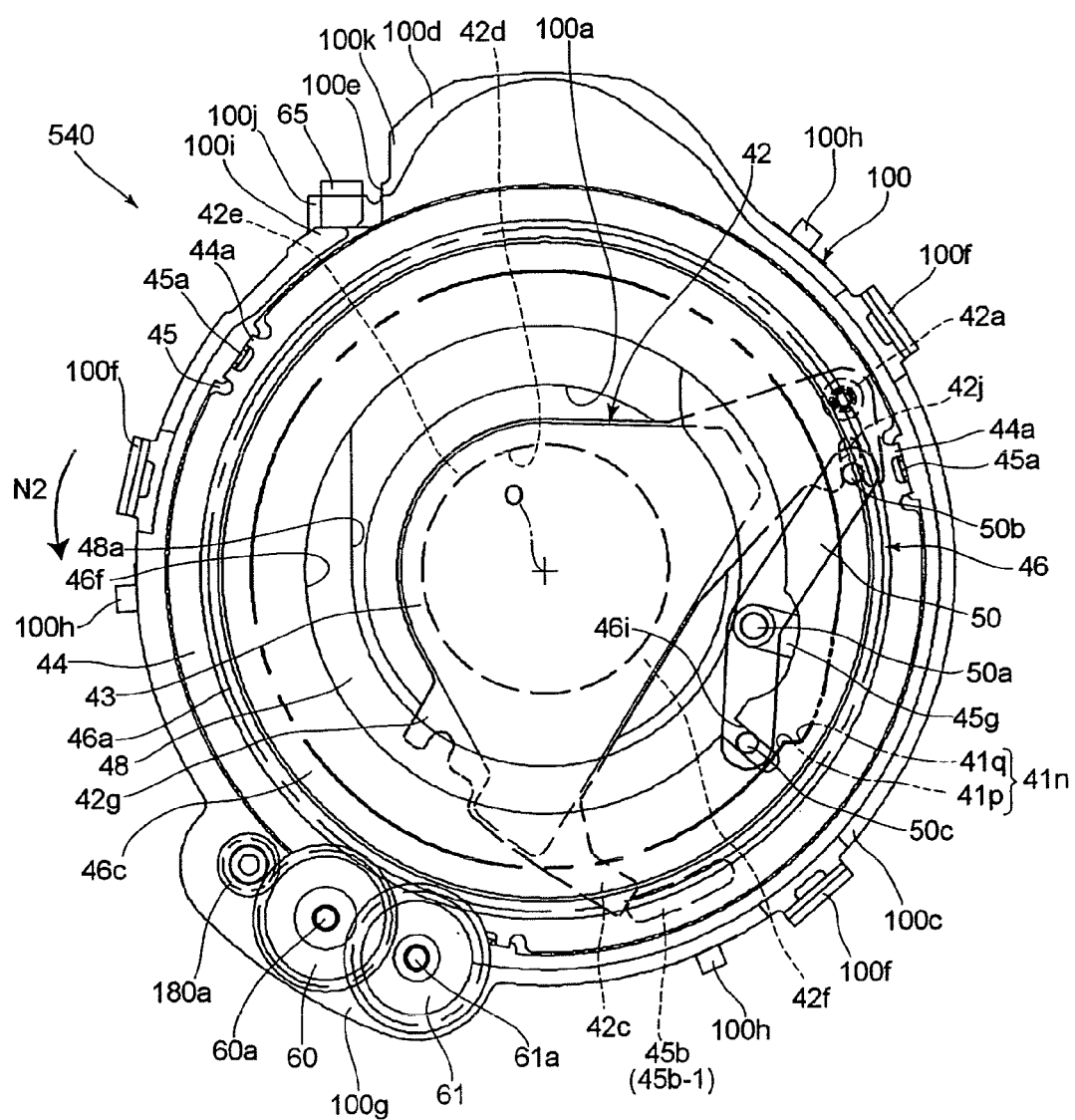
FIG. 27 is a front elevational view of the polarizing filter unit shown in FIG. 26 in the polarizing filter inserted state, viewed from the front in the optical axis direction.
Figure 28:
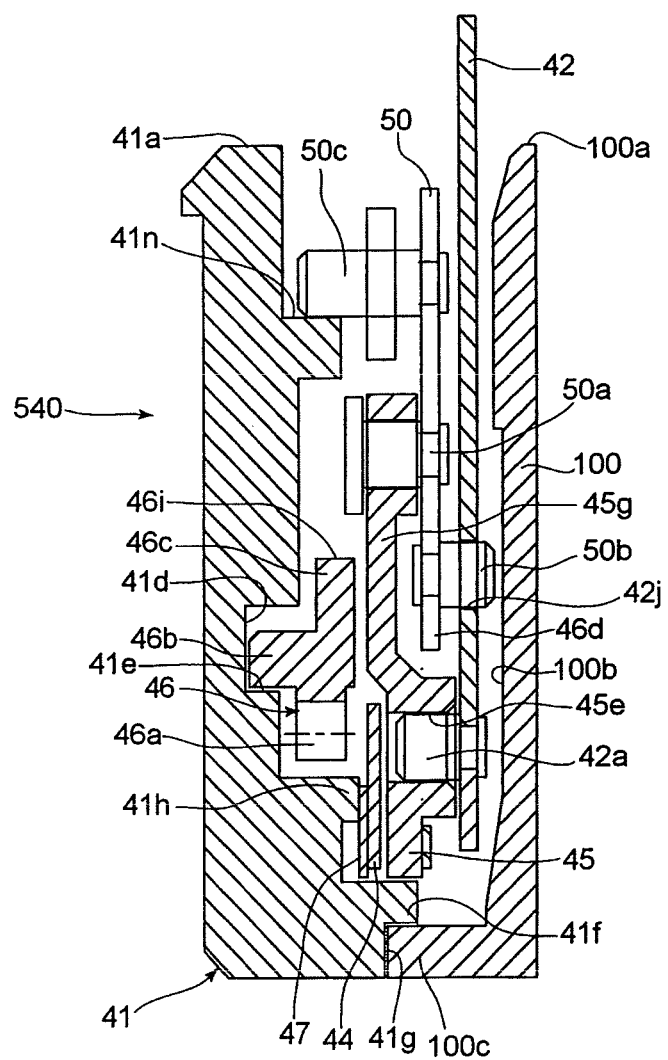
FIG. 28 is a combined sectional view of the polarizing filter unit show in FIG. 26, showing a combination of three sectional views taken along the three lines XXVIII shown in FIG. 26.

In a polarizing filter unit 540 shown in FIGS. 26 through 28, the position control for the filter frame 42 is performed using a drive lever (an element of a removal controller/swingable member) 50. Similar to the above described polarizing filter unit 440, the motor support member 41 is provided with a filter control cam (an element of the removal controller) 41n. The filter control cam 41n is provided with a constant-radius cam portion (an element of the removal controller/cylindrical wall portion) 41p and an accommodating cam portion (an element of the removal controller/accommodating wall portion/guide surface) 41q. The constant-radius cam portion 41p is constant in radius (curvature) about the optical axis O, and the accommodating cam portion 41q bulges radially outwards from the constant-radius cam portion 41p. The accommodating cam portion 41q is formed as a radially outermost portion of a gently inclined surface which is inclined so as to increase the amount of radially outward projection thereof progressively in a direction away from the constant-radius cam portion 41p.

The rotational ring 45 is provided with a support arm 45g which projects radially inwards, and the drive lever 50 is pivoted on a pivot 50a fixed to the support arm 45g of the rotational ring 45 to be swingable about the pivot 50a. The drive lever 50 is provided with a pair of lever portions which extends in different directions from the pivoted portion of the drive lever 50 and is provided at the free ends of the pair of lever portions with a first linkage pin (linkage portion/linkage projection) 50b and a second linkage pin (removal limit portion/rotation transmission projection) 50c, respectively. Each of the first linkage pin 50b and the second linkage pin 50c is in the shape of a cylindrical projection which projects in a direction parallel to the optical axis O. As shown in FIG. 28, the first linkage pin 50b projects rearward (rightward with respect to FIG. 28) in the optical axis direction while the second linkage pin 50c projects forward (leftward with respect to FIG. 28) in the optical axis direction.

The filter frame 42 of the polarizing filter unit 540 is provided in the vicinity of the first support shaft 42a with a slit (rotation transmission portion/elongated hole) 42j into which the first linkage pin 50b of the drive lever 50 is inserted. The slit 42j is an elongated hole which extends in a radial direction about the first support shaft 42a, and the first linkage pin 50b is slidably movable in the lengthwise direction of the slit 42j and prevented from moving in the widthwise direction of the slit 42j.

The annular flange 46c of the driving ring 46 is provided with a slit (elongated hole) 46i into which the second linkage pin 50c is inserted. The slit 46i is an elongated hole which extends from the inner periphery of the annular flange 46c in a radially outward direction from the optical axis O to a position enabling the second linkage pin 50c to come into contact with the filter control cam 41n. The second linkage pin 50c is slidably movable in the lengthwise direction of the slit 46i and prevented from moving in the widthwise direction of the slit 46i.

As shown in FIG. 27, the second linkage pin 50c is spaced from the filter control cam 41n when the filter frame 42 is in the inserted position. When the driving ring 46 is rotated in the direction N2 shown in FIG. 27, an inner surface of the slit 46i presses the second linkage pin 50c to rotate the drive lever 50 counterclockwise with respect to FIG. 27 about the pivot 50a. This counterclockwise rotation of the drive lever 50 causes the first linkage pin 50a to press an inner surface of the slit 42j to rotate the filter frame 42 about the first support shaft 42a in the direction toward the removed position from the inserted position. Subsequently, the second linkage shaft 50c comes into contact with the filter control cam 41n upon the filter frame 42 rotating about the first support pin 42a a predetermined amount of rotation. At this time, whether the second linkage pin 50c comes into contact with the constant-radius cam portion 41p or the accommodating cam portion 41q of the filter control cam 41n depends on the position of the driving ring 46 in the rotational direction thereof at the commencement of the rotation of the filter frame 42 in the direction toward the removed position. In the case where the second linkage pin 50c comes into contact with the constant-radius cam portion 41p, the drive lever 50 is thereupon prevented from rotating counterclockwise, and the filter frame 42 that is linked with the drive lever 50 is held at the limited removed position that is located radially more inward than the fully removed position. Subsequently, the filter frame 42, the rotational ring 45 and the drive lever 50 are integrally rotated in the direction N2 while making the second linkage pin 50c slide on the constant-radius cam portion 41p. Upon the second linkage pin 50c reaching the position of the accommodating cam portion 41q, the second linkage pin 50c is allowed to further move radially outwards, and the drive lever 50 the second linkage pin 50c of which is pressed by an inner surface of the slit 46i in the direction N2 rotates counterclockwise with respect to FIG. 27 about the pivot 50a. This causes the first linkage pin 50a to press an inner surface of the slit 42j to rotate the filter frame 42 to the fully removed position as shown in FIG. 26. At this time, the second linkage pin 50c is engaged with the accommodating cam portion 41q, so that the drive lever 50 is held at a fixed position. Namely, the filter frame 42 is held at the fully removed position. In the case where the second linkage pin 50c comes into contact with the accommodating cam portion 41q from the beginning, the step of making the second linkage pin 50c slide on the constant-radius cam portion 41p (the step of holding the filter frame 42 at the limited removed position) is omitted from the above described operations, and the drive lever 50 moves the filter frame 42 directly to the fully removed position shown in FIG. 26. Although the accommodating cam portion 41q is different in shape from the accommodating cam portion 41m of the previous embodiment, the accommodating cam portion 41q functions as a guide surface which guides the filter frame 42 from the limited removed position to the fully removed position.

When the driving ring 46 is rotated in the direction N1 from the fully removed position shown in FIG. 26, an inner surface of the slit 46i presses the second linkage pin 50c to rotate the drive lever 50 clockwise with respect to FIG. 26 about the pivot 50a. This clockwise rotation of the drive lever 50 causes the first linkage pin 50a to press an inner surface of the slit 42j to rotate the filter frame 42 about the first support shaft 42a from the fully removed position to the inserted position after the filter frame 42 rotates with the rotational ring 45 in the direction N1 that moves the sensor pass-through projection 42g away from the sensor hole 100e. Accordingly, the drive lever 50 functions not only as a removal controller which determines the limited removed position and the fully removed position of the filter frame 42, but also as a rotation transmitter which transmits a rotational driving force of the driving ring 46 to the filter frame 42, and the slit 42j of the filter frame 42 serves as a rotation transmission portion which receives the rotational driving force of the driving ring 46 via the drive lever 50.

In each of the above described polarizing filter units 40, 140, 240, 340, 440 and 540, the insertion/removal operation of the polarizing filter 43 onto and away from an optical path and the rotational operation of the polarizing filter 43 on the optical path are performed by switching between relative rotation and integral rotation of the rotational ring 45 and the driving ring 46, and the filter frame 42 that holds the polarizing filter 43 and is moved in the filter insertion/removal direction is formed as a small and light-weight thin plate member having no complicated moving parts. Accordingly, the drive mechanism for the polarizing filter 43 can be slimmed down in the optical axis direction. In addition, the load on the drive mechanism of the polarizing filter 43 when the polarizing filter 43 is moved can be reduced to a minimum, so that each of the above described polarizing filter units is superior also in electric power saving ability and operational responsiveness.

In addition, when the polarizing filter 43 is removed from the optical path, the filter frame 42 is allowed to move to the fully removed position, in which the polarizing filter 43 is fully removed from the optical path, when the filter frame 42 is positioned at a specific position in the rotational direction about the optical axis O, and the filter frame 42 is allowed to rotate about the optical axis O while being prevented from rotating about the first support shaft 42a at the limited removed position, which is located radially more inward than the fully removed position, when positioned at any other position in the rotational direction of the filter frame 42 about the optical axis O. Due to this structure, the diameter of the polarizing filter unit does not have to be set to correspond to the fully removed position over the whole circumference of the polarizing filter unit, which makes it possible to prevent the polarizing filter unit from being enlarged in the radial direction. In addition, since the fully removed position of the filter frame 42 is set at a specific position in the rotational direction of the filter frame 42 about the optical axis O, the removed state of the filter frame 42 can be securely detected by a simple structure using the filter detection sensor 65. Since the portion which makes the filter frame 42 perform such removal operation control is formed into the shape of a wall surface or a cam surface on the base member 100 or the motor support member 41, which serves as a support member for moving parts of the polarizing filter unit, such a portion is space-saving and simple in structure and therefore can be made at low cost.

In each of the above described polarizing filter units 40, 140, 240, 340, 440 and 540, when the filter frame 42 is in the fully removed position, the sensor pass-through projection 42g that projects from the filter frame 42 is inserted into the sensor hole 100e of the base member 100, so that the filter frame 42 is prevented from rotating in the direction toward the inserted position by abutment of the sensor pass-through projection 42g against the limit wall 100i that is exposed to the sensor hole 100e (see FIGS. 15A, 17F, 22 and 26). The prevention of rotation of the filter frame 42 in the direction toward the inserted position by the limit wall 100i is not canceled until when the sensor pass-through projection 42g is removed from the sensor hole 100e by rotating the filter frame 42 in the direction N1 about the optical axis O together with the driving ring 46 and the rotational ring 45.

Since rotational resistance is exerted on the rotational ring 45 by the resistance applying springs 49 and since the driving ring 46 is held by the engagement with the gear train running from the pinion 180a of the filter drive motor 180 to the first and second gears 60 and 61, a force retaining the position of the filter frame 42 in the filter insertion/removal direction operates in a state where the driving ring 46 is stationary without being driven by the filter drive motor 180. However, there is a possibility of a relative positional deviation in the rotational direction occurring between the rotational ring 45 and the driving ring 46 in the case where large backlash and play exist in the gear train for the transmission of the driving force of the filter drive motor 180 or an impact is applied to the polarizing filter unit from outside. In such cases, the filter frame 42 can be reliably held in the fully removed position by being prevented from rotating in the direction toward the inserted position by the engagement between the sensor pass-through projection 42g and the limit wall 100i.

In each of the above described polarizing filter units 40, 140, 240, 340, 440 and 540, the inner diameter side edge 42f is positioned in the close vicinity of the center opening 100a of the base member 100 to minimize the size of the polarizing filter unit in the radial direction, as shown in FIGS. 6, 22 and 26, when the filter frame 42 is in the fully removed position. In other words, the amount of rotation of the filter frame 42 in the direction toward the removed position when the polarizing filter 43 is not in use is reduced to a minimum. Therefore, if the filter frame 42 rotates even slightly in the direction toward the inserted position from the fully removed position, there is a possibility of the filter frame 42 entering the optical path defined by the central opening 100a and thus interfering with light rays from an object. However, since the filter frame 42 is prevented from moving in the direction toward the inserted position from the fully removed position by engagement between the sensor pass-through projection 42g and the limit wall 100i, it is possible to reliably prevent the interference of the filter frame 42 with the optical path from occurring when the filter frame 42 is not in use (in the removed state) while achieving miniaturization of the polarizing filter unit 40.

The base member 100 has the outer surrounding wall 100c and the filter-accommodating wall 100d that are provided as a wall surrounding the outside of the filter frame 42 in the radial direction about the optical axis O, and the limit wall 100i is formed as a part of this surrounding wall. The outer surrounding wall 100c and the filter-accommodating wall 100d function as a removal limiter (removal controller) which limits rotation of the filter frame 42 in the filter removing direction; whereas the limit wall 100i functions as a removed position holder which limits rotation of the filter frame 42 in the filter insertion direction. With such a multiple function given to a common wall of the base member 100, simplification of the structure of the base member 100 has been achieved.

In addition, the sensor pass-through projection 42g is a projection having a simple shape which is formed integral with the body of the thin-plate filter frame 42, thus being easy to produce. Additionally, the sensor pass-through projection 42g also functions as a portion of the filter frame 42 which is detected by the filter detection sensor 65 to detect that the filter frame 42 is in the fully removed position, so that the filter frame 42 can be held and detected at the fully removed position by a simple structure which is superior in space-efficiency.

Additionally, the polarizing filter unit is structured such that the position detection of the filter frame 42 using the filter detection sensor 65 is performed only when the filter frame 42 reaches the fully removed position after performing an operation to remove the filter frame 42 in a specific manner, and that the filter detection sensor 65 does not falsely (or prematurely) detect the filter frame 42 during movement of the filter frame 42 toward (or away from) the fully removed position via any other manner.

More specifically, the sensor hole 100e is formed in the base member 100 in the close vicinity of the boundary between the filter-accommodating wall 100d and the outer surrounding wall 100c, and a portion of the outer surrounding wall 100c which faces the sensor hole 100e is formed as the limit wall 100i. In addition, the filter-accommodating wall 100d is provided with a limit wall 100k that is formed as a portion of the filter-accommodating wall 100d which faces the sensor hole 100e. In other words, the sensor hole 100e is formed by a gap between the limit wall 100i and the limit wall 100k. The distance between the limit wall 100i and the limit wall 100k (i.e., the width of the opening of the sensor hole 100e) is set to be slightly greater than the width of the sensor pass-through projection 42g.

The operation to remove the filter frame 42 from a state where the filter frame 42 is in the inserted position can be performed from any given position in the rotational direction about the optical axis O, and the filter frame 42 which rotates in the filter removing direction about the first support shaft 42a is prevented from further rotating in the filter removing direction by abutting against the inner wall surface of the outer surrounding wall 100c or the filter-accommodating wall 100d. If this removing rotation of the filter frame 42 is started from a specific position in the rotational direction of the filter frame 42 about the optical axis O, the filter frame 42 directly approaches the sensor hole 100e from its inserted position; the width and orientation of the opening of the sensor hole 100e, which is defined by the limit wall 100i and the limit wall 100k, are determined not to allow any part of the filter frame 42 including the sensor pass-through projection 42g to enter the sensor hole 100e in such a case. Therefore, upon the filter frame 42 coming near to the sensor hole 100e, the outer diameter side edge 42e or the sensor pass-through projection 42g comes into contact with the limit wall 100i and/or 100k to prevent the filter frame 42 from entering the sensor hole 100e.

Figure 17F:
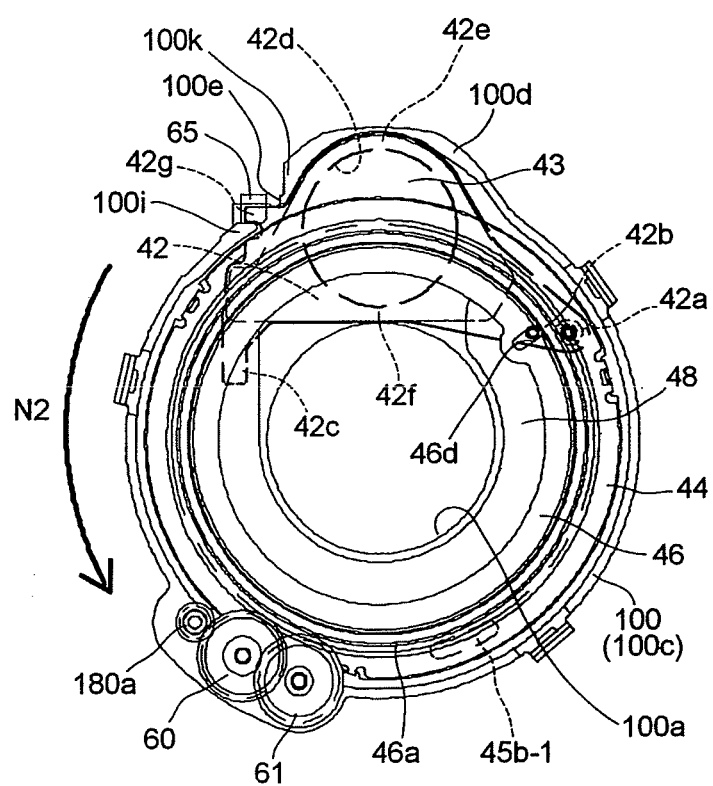

Rotating the driving ring 46 in the direction N2 shown in FIG. 17A with the filter frame 42 prevented from rotating by the limit wall 100i and/or 100k causes the rotational ring 45 and the filter frame 42 to rotate together with the driving ring 46 about the optical axis O so that the outer diameter side edge 42e of the filter frame 42 moves away from the sensor hole 100e to slide on the outer surrounding wall 100c (see FIGS. 17B through 17D). Thereafter, the filter frame 42 rotates integrally with the driving ring 46 until the filter frame 42 reaches the fully removed position by the rotational driving of the driving ring 46 in the direction N2. As shown in FIG. 17E, the sensor hole 100e is formed as an opening which is open in a specific direction and allows the sensor pass-through projection 42g to enter therein only when the filter frame 42 reaches the fully removed position, in which the filter frame 42 enters the filter-accommodating wall 100d, and is moved together with the driving ring 46 in the direction N2. Therefore, the sensor pass-through projection 42g enters the sensor hole 100e at the final stage of the removal operation of the filter frame 42 that is shown in FIG. 17E through FIG. 17F. In the other operations, not only the outer diameter side edge 42e but also the sensor pass-through projection 42g are prevented from entering the sensor hole 100e by the limit wall 100i or 100k. To achieve this control, the sensor pass-through projection 42g is formed to be located at the same position as the sensor hole 100e in a radial direction from the optical axis O and to project in the direction N2 when the filter frame 42 is in the fully removed position. The limit walls 100i and 100k are formed to be greater in wall thickness in the radial direction than any other part of the outer surrounding wall 100c and the filter-accommodating wall 100d, respectively, to define a shape that prevents the filter frame 42 from erroneously entering the sensor hole 100e. This makes it possible to obtain the effect of securing a sufficient strength in the vicinity of the sensor hole 100e.

Although the present invention has been described based on the above illustrated embodiments, the present invention is not limited to these particular embodiments; details of the drive system for the polarizing filter 43 can be modified to adopt a different structure from those in the above described embodiments without departing from the sprit and scope of the invention.

For instance, although the filter frame 42 is prevented from rotating toward the inserted position by engagement between the sensor pass-through projection 42g and the limit wall 100i of the base member 100 when the filter frame 42 is in the fully removed position in each of the above described embodiments, the present invention can be applied even if such a filter-frame-removal holding structure using the limit wall 100i is omitted. In such a case, if the driving ring 46 is driven to rotate in the direction N1 in the filter removed state shown in FIGS. 6 and 26, the rotation of the filter frame 42 about the first support shaft 42a toward the inserted position can be started at once without rotating the rotational ring 45.

Additionally, although the insertion/removal operation of the polarizing filter 43 and the rotational operation of the polarizing filter 43 on an optical path are performed by selectively operating the filter insertion switch 71, the filter removal switch 72 and the filter rotation switch 73 in the above illustrated embodiments, it is possible to make these operations of the polarizing filter 43 performed by any other type of operating device. Alternatively, the present invention is applicable to a type of optical apparatus in which the insertion/removal operation and rotation of the polarizing filter 43 is carried out automatically, i.e., without manipulating a switch.

Additionally, although the polarizing filter 43 is adopted as a rotatable optical element in the above described embodiments, the present invention is applicable to any other type of drive system for an optical element (not only a polarizing filter but also a cross filter, a polygonal-surface multi image filter or the like) which produces a specific effect in an inserted state when positioned in an optical path of a photographing optical system and rotated thereat.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A drive system for a rotatable optical element which is insertable into and removable from an optical path of a photographing optical system, and also rotatable about an optical axis of said photographing optical system when said rotatable optical element is positioned in said optical path, said drive system comprising:
    a support member;
    a rotational driving member which is supported by said support member to be rotatable about said optical axis and which is driven to rotate about said optical axis by a driving source;
    a rotational driven member which is supported by said support member to be rotatable about said optical axis and which is rotatable about said optical axis relative to said rotational driving member;
    a resistance applier which applies rotational resistance to said rotational driven member;
    a holding member which holds said rotatable optical element, includes a rotation transmission portion, to which a force in a rotational direction about said optical axis is transmitted from said rotational driving member, and a pivotal support portion pivotally supported on said rotational driven member, wherein said holding member inserts and removes said rotatable optical element into and from said optical path by forward and reverse rotations of said holding member about said pivotal support portion;
    an insertion controller which prevents said holding member from rotating when said holding member is in an inserted position, in which said rotatable optical element is inserted into said optical path; and
    a removal controller which allows said holding member to move to a fully removed position from said optical path when said holding member is positioned at a specific position in a rotational direction of said holding member about said optical axis, and said removal controller prevents said holding member from rotating about said pivotal support portion at a limited removed position, wherein said limited removed position is located radially closer to said optical axis than said fully removed position, when said holding member is positioned at any other position in said rotational direction of said holding member,
    wherein a differential rotation occurs between said rotational driven member, to which said resistance applier applies said rotational resistance, and said rotational driving member to thereby cause said holding member to rotate in an optical-element insertion/removal direction about said pivotal support portion by rotating said rotational driving member in a direction in which said holding member is not prevented from rotating by said insertion controller and said removal controller,
    wherein said rotational driven member and said holding member rotate with said rotational driving member about said optical axis against said rotational resistance, which is applied to said rotational driven member by said resistance applier, by rotating said rotational driving member in a direction in which said holding member is prevented from rotating by said insertion controller when said holding member is in said inserted position, and
    wherein said rotational driven member and said holding member rotate with said rotational driving member about said optical axis against said rotational resistance, which is applied to said rotational driven member by said resistance applier, by rotating said rotational driving member in a direction in which said holding member is prevented from rotating by said removal controller when said holding member is positioned at said limited removed position, and said holding member rotates to said fully removed position by rotating said rotational driving member in said direction, in which said holding member is prevented from rotating by said removal controller, upon being positioned at said specific position in said rotational direction of said holding member.

2. The drive system according to claim 1, wherein at least a part of said removal controller is formed on said support member.

3. The drive system according to claim 2, wherein said removal controller comprises:
    a cylindrical wall portion having a constant diameter about said optical axis which is formed on said support member;
    an accommodating wall portion which is continuous with said cylindrical wall portion and projects in a radially outward direction away from said optical axis; and
    a removal limit portion which is provided on said holding member and holds said holding member at said limited removed position by abutting against said cylindrical wall portion,
    wherein said holding member is allowed to rotate to said fully removed position when said removal limit portion and said accommodating wall portion are substantially aligned in a radial direction from said optical axis.

4. The drive system according to claim 3, wherein said rotational driving member comprises an elongated hole that is elongated in a radial direction from said optical axis,
    wherein said rotation transmission portion of said holding member is formed as a projection which is inserted into said elongated hole in a manner to be prevented from moving in said rotational direction relative to said elongated hole and allowed to move in the radial direction of said elongated hole, and
    wherein said projection constitutes said removal limit portion.

5. The drive system according to claim 2, wherein said removal controller comprises:

a cylindrical wall portion, having a constant diameter about said optical axis, formed on said support member;

an accommodating wall portion which is continuous with said cylindrical wall portion and projects in a radially outward direction away from said optical axis; and a swingable member which is pivotally supported by said rotational driven member via a pivot that is parallel to said optical axis, said swingable member including a removal limit portion which is contactable said cylindrical wall portion, and a linkage portion which is engaged with said holding member, wherein said holding member is held at said limited removed position by abutment of said removal limit portion against said cylindrical wall portion, and wherein said holding member is allowed to rotate to said fully removed position when said removal limit portion of said swingable member and said accommodating wall portion are substantially aligned in a radial direction from said optical axis.

6. The drive system according to claim 5, wherein said holding member is held in said fully removed position by abutment of said removal limit portion of said swingable member against said accommodating wall portion of said support member.

7. The drive system according to claim 5, wherein said linkage portion of said swingable member comprises a linkage projection which projects in a direction parallel to said optical axis, and wherein said rotation transmission portion of said holding member is formed from an elongated hole into which said linkage projection of said swingable member is slidably inserted.

8. The drive system according to claim 5, wherein said rotational driving member comprises an elongated hole that is elongated in a radial direction from said optical axis, wherein said swingable member comprises a rotation transmission projection which is inserted into said elongated hole in a manner to be prevented from moving in said rotational direction relative to said elongated hole and allowed to move in the radial direction of said elongated hole, and wherein said rotation transmission projection constitutes said removal limit portion.

9. The drive system according to claim 3, wherein said accommodating wall portion comprises a guide surface which guides said holding member from said limited removed position to said fully removed position while making said removal limit portion slide on said guide surface.

10. The drive system according to claim 5, wherein said accommodating wall portion comprises a guide surface which guides said holding member from said limited removed position to said fully removed position while making said removal limit portion slide on said guide surface.

11. The drive system according to claim 1, wherein said resistance applier comprises a biaser which biases said rotational driven member in said optical axis direction to create a frictional resistance between said rotational driven member and said support member.

12. The drive system according to claim 1, wherein said insertion controller comprises a pair of contact portions which are respectively provided on said holding member and said rotational driven member to be capable of coming into contact with each other.

13. The drive system according to claim 1, wherein said insertion controller comprises a pair of contact portions which are respectively provided on said holding member and said rotational driving member to be capable of coming into contact with each other.

14. The drive system according to claim 1, wherein said insertion controller comprises a pair of contact portions which are respectively provided on said rotational driven member and said rotational driving member to be capable of coming into contact with each other.

15. The drive system according to claim 1, wherein said rotational optical element comprises a polarizing filter.

* * * * *